US011169688B2

(12) United States Patent
Dong et al.

(10) Patent No.: US 11,169,688 B2
(45) Date of Patent: Nov. 9, 2021

(54) MESSAGE PROCESSING METHOD, MESSAGE VIEWING METHOD, AND TERMINAL

(71) Applicant: HUAWEI TECHNOLOGIES CO., LTD., Guangdong (CN)

(72) Inventors: Chen Dong, Beijing (CN); Yu Wang, Beijing (CN); Xiaohan Chen, Shenzhen (CN); Yixin Chen, Shenzhen (CN); Fan Yang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/651,315

(22) PCT Filed: Sep. 19, 2018

(86) PCT No.: PCT/CN2018/106353
§ 371 (c)(1),
(2) Date: Mar. 26, 2020

(87) PCT Pub. No.: WO2019/062611
PCT Pub. Date: Apr. 4, 2019

(65) Prior Publication Data
US 2020/0225825 A1 Jul. 16, 2020

(30) Foreign Application Priority Data
Sep. 29, 2017 (CN) .......................... 201710908636.X

(51) Int. Cl.
*G06F 3/0488* (2013.01)
*G06F 9/451* (2018.01)
(Continued)

(52) U.S. Cl.
CPC .......... *G06F 3/0488* (2013.01); *G06F 3/0481* (2013.01); *G06F 3/0484* (2013.01);
(Continued)

(58) Field of Classification Search
CPC combination set(s) only.
See application file for complete search history.

(56) References Cited

U.S. PATENT DOCUMENTS

| 2009/0083761 | A1* | 3/2009 | Mully | H04L 51/066 |
| | | | | 719/314 |
| 2011/0028096 | A1* | 2/2011 | Tokunaga | H04N 5/23293 |
| | | | | 455/41.2 |

(Continued)

FOREIGN PATENT DOCUMENTS

| CN | 102420778 A | 4/2012 |
| CN | 102938815 A | 2/2013 |

(Continued)

*Primary Examiner* — Van N Chow
(74) *Attorney, Agent, or Firm* — Womble Bond Dickinson (US) LLP

(57) ABSTRACT

This application relates to the field of terminals, and discloses a message processing method, message viewing method, and terminal, configured to implement quick message processing and viewing without affecting a current operation. The message processing method is applied to a terminal including a display screen, and the method includes: displaying, by the terminal, an application interface on the display screen; receiving, by the terminal, a message; displaying, by the terminal, a prompt of the message on the application interface; receiving, by the terminal, an input of a user; and continuing displaying, by the terminal, the application interface, responding to the input, terminating displaying the prompt, and processing the message. Embodiments of this application are applied for processing the message.

20 Claims, 43 Drawing Sheets

(51) Int. Cl.
*G06F 3/0481* (2013.01)
*G06F 3/0484* (2013.01)
*H04M 1/72454* (2021.01)
*H04M 1/7243* (2021.01)
*H04M 1/72403* (2021.01)
*G06Q 10/10* (2012.01)

(52) U.S. Cl.
CPC .......... *G06F 3/04845* (2013.01); *G06F 9/451* (2018.02); *G06Q 10/107* (2013.01); *H04M 1/7243* (2021.01); *H04M 1/72403* (2021.01); *H04M 1/72454* (2021.01)

(56) References Cited

U.S. PATENT DOCUMENTS

| | | | |
|---|---|---|---|
| 2014/0018049 A1 | 1/2014 | Cannon et al. | |
| 2014/0038561 A1* | 2/2014 | Wang | H04W 12/086 455/411 |
| 2014/0370861 A1 | 12/2014 | Flynn et al. | |
| 2016/0112632 A1 | 4/2016 | Du et al. | |
| 2017/0155752 A1 | 6/2017 | Qian et al. | |
| 2020/0225825 A1* | 7/2020 | Dong | G06F 3/017 |

FOREIGN PATENT DOCUMENTS

| | | |
|---|---|---|
| CN | 103581401 A | 2/2014 |
| CN | 103747184 A | 4/2014 |
| CN | 104009910 A | 8/2014 |
| CN | 104506715 A | 4/2015 |
| CN | 104539791 A | 4/2015 |
| CN | 104660908 A | 5/2015 |
| CN | 104902170 A | 9/2015 |
| CN | 105095120 A | 11/2015 |
| CN | 105657257 A | 6/2016 |
| CN | 106201668 A | 12/2016 |
| CN | 106210539 A | 12/2016 |
| CN | 106331336 A | 1/2017 |
| CN | 103220210 B | 2/2017 |
| CN | 106375660 A | 2/2017 |
| CN | 106454139 A | 2/2017 |
| CN | 106470271 A | 3/2017 |
| CN | 106648661 A | 5/2017 |
| CN | 106843654 A | 6/2017 |
| CN | 107087072 A | 8/2017 |
| CN | 107193664 A | 9/2017 |
| WO | 2014019466 A1 | 2/2014 |
| WO | 2014035004 A1 | 3/2014 |

* cited by examiner

TO FIG. 15C & FIG. 15D

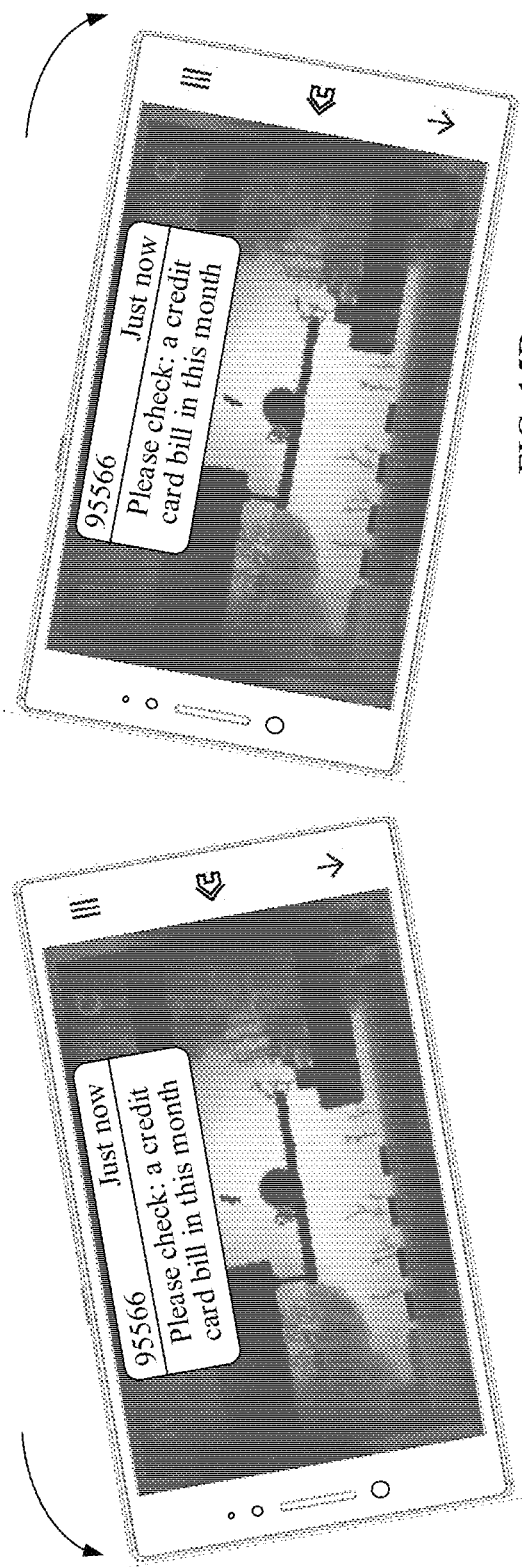

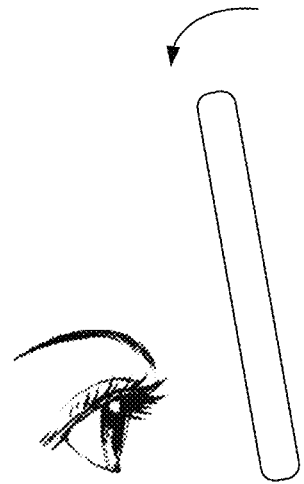
FIG. 16A
FIG. 16B
FIG. 16C
TO FIG. 16D

FIG. 17A          FIG. 17B

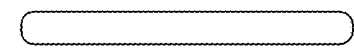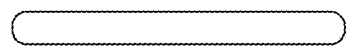
FIG. 17C          FIG. 17D
TO FIG. 17E

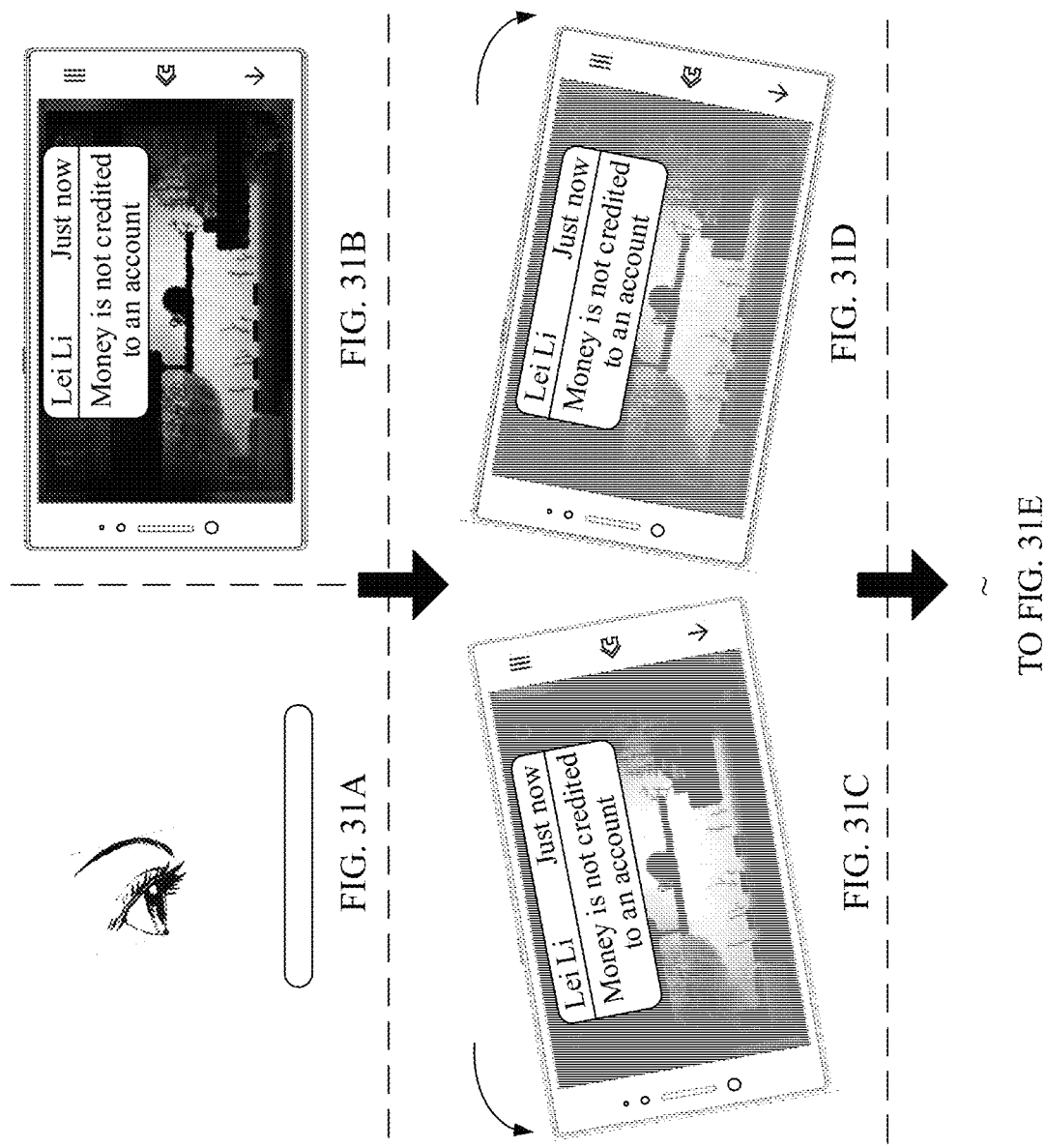

MESSAGE PROCESSING METHOD, MESSAGE VIEWING METHOD, AND TERMINAL

CROSS-REFERENCE TO RELATED APPLICATIONS

This application is a National Stage of International Application No. PCT/CN2018/106353, filed on Sep. 19, 2018, which claims priority to Chinese Patent Application No. 201710908636.X, filed on Sep. 29, 2017. Both of the aforementioned applications are hereby incorporated by reference in their entireties.

TECHNICAL FIELD

Embodiments of this application relate to the field of terminal technologies, and in particular, to a message processing method, a message viewing method, and a terminal.

BACKGROUND

For terminals such as a mobile phone and a tablet computer, instant messaging functions such as a short message service message and WeChat are basic functions of the terminals. With continuous development of software and hardware, the terminals support more functions, and people also become increasingly accustomed to using the terminals to process daily transactions, such as viewing videos, browsing web pages, playing games, and performing a video or voice chat.

During daily use, a message notification is usually presented to a user when the user uses the terminal to process a transaction. In this case, the user is not convenient to operate a screen to process the message. Typically, for example, a short message service message is received when the user uses the terminal to play an online game. In this case, the user operates the game quickly by using fingers. Although content of the message is relatively important, the user cannot stop to process the message.

SUMMARY

This application provides a message processing method, message viewing method, and terminal, configured to implement quick message processing and viewing without affecting a current operation.

To achieve the foregoing objective, this application uses the following technical solutions.

According to a first aspect, this application provides a message processing method, applied to a terminal including a display screen, and the method may include: displaying, by the terminal, an application interface on the display screen; receiving, by the terminal, a message; displaying, by the terminal, a prompt of the message on the application interface; receiving, by the terminal, an input of a user; and continuing displaying, by the terminal, the application interface, responding to the input, terminating displaying the prompt, and processing the message. By means of the message processing method provided in this application, when an application interface is displayed, a message comes, and a prompt of the message is displayed on the application interface, displaying the prompt of the message is canceled by receiving the input of the user and only the application interface is redisplayed, at the same time, the message is processed. The user may continue to perform an operation on an original application interface, thereby implementing quick message processing without affecting the current operation.

In a possible implementation, the prompt of the message may include: a part or all of content of the message, or a character description or graphical representation of receiving a new message, or the like. The implementation provides possible forms of the prompt of the message.

In a possible implementation, the message may include, but is not limited to: the text, voice, picture, video, emoticon, notification, short message service message, Email, instant messaging message (for example, Fetion, Easychat, WeChat, QQ, Facebook Messenger, Viber, BlackBerry Messenger, Skype, Google Talk, WhatsApp, Telegram), and the like. The implementation provides possible types of the message.

In a possible implementation, the input of the user may include: shaking the terminal in a manner, using expressions and actions, blinking, smiling, voicing, knocking on the back surface of a mobile phone for several times, pressing a fingerprint sensor, and the like. The implementation provides possible forms of the input of the user.

In a possible implementation, the foregoing processing the message may include at least one of the following: storing the message in a preset interface; or, marking the message; or, adjusting a location of the message; or, performing an assortment on the message. The implementation provides possible forms for processing the message.

In a possible implementation, the marking the message may include: marking the message when the prompt of the message is displayed, or, marking the message in a lock screen interface or an unlock screen interface; or, marking the message in a notification center interface. The implementation provides possible forms for marking the message.

In a possible implementation, the performing an assortment on the message may include: performing the assortment on the message based on characteristic information of the message, where the characteristic information is used to identify a common characteristic of a plurality of messages, and the characteristic information may include at least one of a source, time, a date, a day of a week, a type, a size, duration, or a quantity of characters of the message. The implementation provides possible forms for performing the assortment on the message.

In a possible implementation, when the terminal displays the prompt of the message on the application interface, the method may further include: displaying prompt information, where the prompt information is used to instruct the user to perform the input. The implementation is convenient for the user to learn how to process the message through the input.

In a possible implementation, after the processing the message succeeds, the method may further include: displaying a prompt indicating that the processing succeeds. The implementation is convenient for the user to learn of a processing result.

In a possible implementation, the method may further include: displaying, by the terminal, a processed message on the display screen after the terminal stops displaying the application interface on the display screen. The implementation implements a message re-prompting function.

In a possible implementation, when the prompt of the message is displayed on the application interface, the method may further include: displaying, by the terminal, an input box on the application interface; and receiving, by the terminal, another input of the user in the input box; and when processing the message, the method may further include: responding to the another input, and storing content of the another input in the message. The implementation implements adding a comment or reply content for the message.

In a possible implementation, the application interface may include: a video play interface, an audio play interface, an instant messaging application interface, a news application interface, a novel reading interface, a shopping interface, a display ticketing interface, or a game interface. The implementation provides possible forms of the application interface.

According to a second aspect, a message viewing method is provided and applied to a terminal including a display screen, and the method may include: displaying, by the terminal, an application interface on the display screen; receiving, by the terminal, a message; displaying, by the terminal, a prompt of the message on the application interface; receiving, by the terminal, an input of a user; and responding to the input, and displaying, on the display screen, an interaction application interface corresponding to the message. By means of the message viewing method provided in this application, when an application interface is displayed, a message comes, and a prompt of the message is displayed on the application interface, an action of viewing the message is performed by receiving the input of the user, and the action of viewing the message does not need to be performed based on detecting a touch or tap performed by the user on the display screen, thereby implementing quick message viewing without affecting the current operation.

In a possible implementation, the message may include, but is not limited to: the text, voice, picture, video, emoticon, notification, short message service message, Email, instant messaging message (for example, Fetion, Easychat, WeChat, QQ, Facebook Messenger, Viber, BlackBerry Messenger, Skype, Google Talk, WhatsApp, Telegram), and the like. The implementation provides possible types of the message.

In a possible implementation, the displaying, on the display screen, an interaction application interface corresponding to the message may include: displaying, by the terminal, on the display screen in a floating window form or full screen, the interaction application interface corresponding to the message. The implementation provides possible forms for displaying the interaction application interface.

In a possible implementation, the method may further include: receiving, by the terminal, another input of the user; and responding to the another input, and stopping displaying, on the display screen, the interaction application interface corresponding to the message. The implementation implements canceling displaying the interaction application interface corresponding to the message without operating the screen.

In a possible implementation, the application interface may include: a video play interface, an audio play interface, an instant messaging application interface, a news application interface, a novel reading interface, a shopping interface, a display ticketing interface, or a game interface. The implementation provides possible forms of the application interface.

According to a third aspect, a terminal including a display screen is provided, and the terminal further includes: a display unit, configured to display an application interface on the display screen; a first receiving unit, configured to receive a message; the display unit, further configured to display a prompt of the message on the application interface; a second receiving unit, configured to receive an input of a user; the display unit, further configured to continue displaying the application interface, respond to the input, and terminating display the prompt; and a processing unit, configured to respond to the input, and process the message. Based on a same inventive concept, for a principle of resolving a problem by the terminal and beneficial effects, refer to the foregoing first aspect, possible method implementations of the first aspect, and beneficial effects arising. Therefore, for an implementation of the terminal, refer to the foregoing first aspect and the possible method implementations of the first aspect. Details are not repeated herein again.

According to a fourth aspect, a terminal including a display screen is provided, and the terminal further includes: a display unit, configured to display an application interface on the display screen; a first receiving unit, configured to receive a message; the display unit, further configured to display, on the application interface, a prompt of the message received by the receiving unit; a second receiving unit, configured to receive an input of a user; and the display unit, further configured to the respond to the input received by the receiving unit, and display, on the display screen, an interaction application interface corresponding to the message. Based on a same inventive concept, for a principle of resolving a problem by the terminal and beneficial effects, refer to the foregoing second aspect, possible method implementations of the second aspect, and beneficial effects arising. Therefore, for an implementation of the terminal, refer to the foregoing second aspect and the possible method implementations of the second aspect. Details are not repeated herein again.

According to a fifth aspect, a terminal is provided, and the terminal includes: one or more processors, a memory, a bus system, and one or more programs, where the processor and the memory are connected by using the bus system; and the one or more programs are stored in the memory, the one or more programs include an instruction, and when the instruction is executed by the terminal, the terminal is enabled to perform the first aspect and possible method implementations of the first aspect, or perform the second aspect and possible method implementations of the second aspect.

According to a sixth aspect, a computer-readable storage medium storing one or more programs is provided, the one or more programs include an instruction, and when the instruction is executed by a terminal, the terminal is enabled to perform the first aspect and possible method implementations of the first aspect, or perform the second aspect and possible method implementations of the second aspect.

According to a seventh aspect, a graphical user interface on a portable electronic device is provided, where the portable electronic device includes a display, a memory, a plurality of application programs, and one or more processors that are configured to execute one or more programs stored in the memory, the graphical user interface includes a user interface displayed in the first aspect and possible method implementations of the first aspect, or the second aspect and possible method implementations of the second aspect, and the display includes a touch-sensitive surface and a display screen.

According to an eighth aspect, a graphical user interface (GUI) is provided, the graphical user interface is stored in an electronic device, and the electronic device includes a touchscreen, a memory, one or more processors, the foregoing one or more processors are configured to execute one or more computer programs that are stored in the memory. The foregoing graphical user interface includes: a first GUI displayed on the touchscreen, where the first GUI includes an application interface and a prompt of a message; and in response to an input of a user, a second GUI displayed on the touchscreen, where the second GUI includes the application interface.

According to an eighth aspect, an electronic device is provided, where the electronic device includes an apparatus performing the first aspect and possible method implementations of the first aspect, or performing the second aspect and possible method implementations of the second aspect.

According to a ninth aspect, a computer program product including an instruction is provided, where when the computer program product runs on an electronic device, the electronic device is enabled to perform the method of the first aspect and of possible method implementations of the first aspect, or perform the method of the second aspect and of possible method implementations of the second aspect.

BRIEF DESCRIPTION OF DRAWINGS

FIG. 15A to FIG. 15E are a schematic diagram 1 of processing a message by shaking a mobile phone according to an embodiment of this application;

FIG. 16A to FIG. 16D are a schematic diagram 2 of processing a message by shaking a mobile phone according to an embodiment of this application;

FIG. 17A to FIG. 17E are a schematic diagram 3 of processing a message by shaking a mobile phone according to an embodiment of this application;

FIG. 31A to FIG. 31E are a schematic flowchart 3 of a message viewing method according to an embodiment of this application;

DESCRIPTION OF EMBODIMENTS

Figure 1A:
FIG. 1A and FIG. 1B are a schematic diagram of an appearance of a mobile phone according to an embodiment of this application.
Figure 1B:
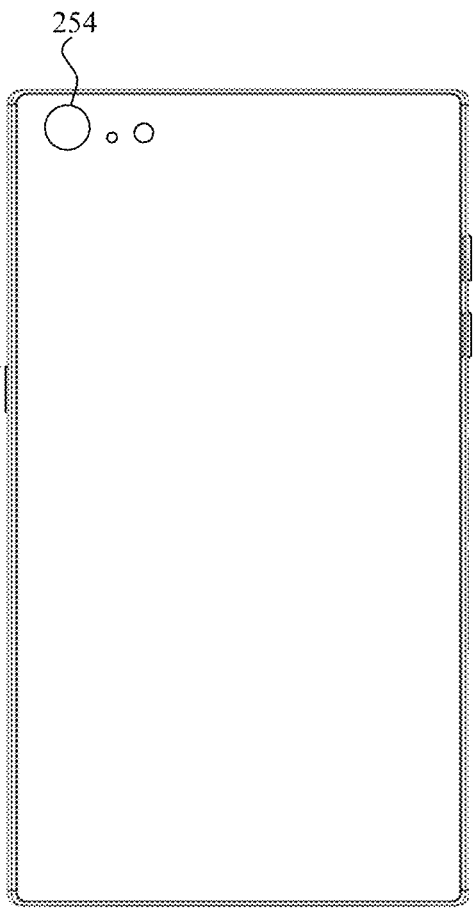
Figure 2:
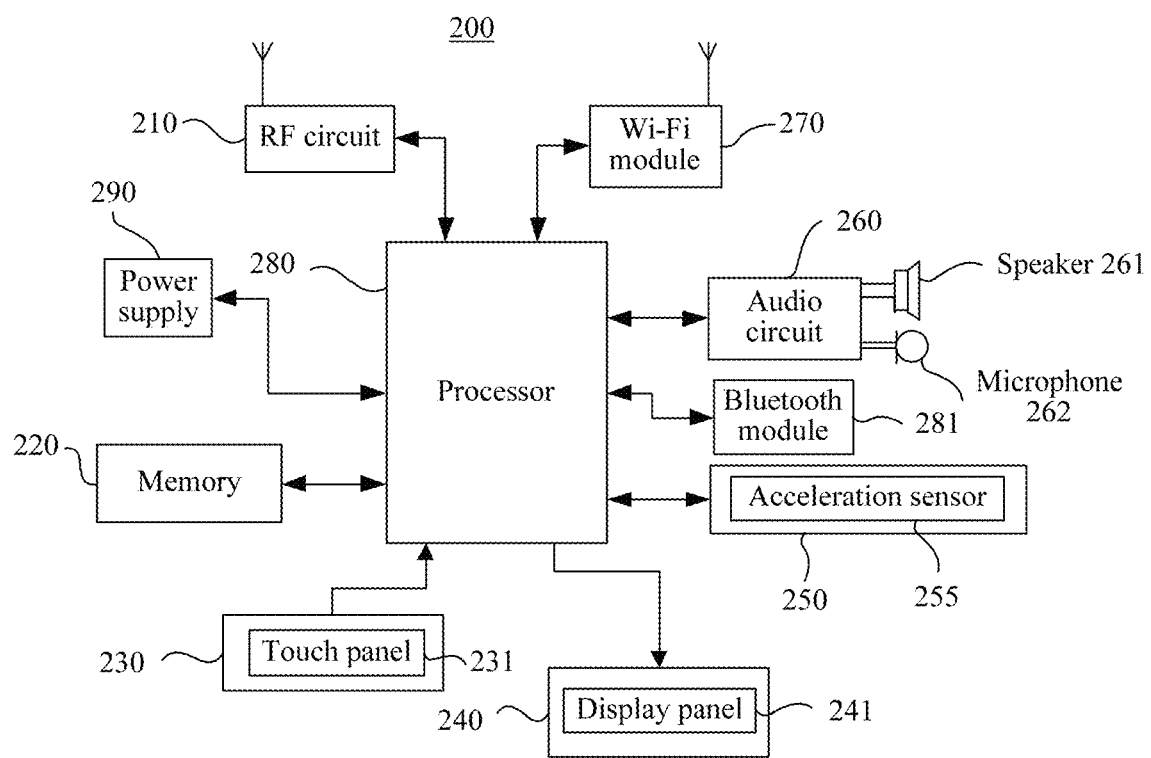
FIG. 2 is a schematic diagram of an architecture of a mobile phone according to an embodiment of this application.

The terminal in this application may be each device configured with a display screen and an acceleration sensor, for example, the terminal may include, but is not limited to, a wearable electronic device (for example, a smartwatch, a smart band, smart glasses, and the like), a tablet computer, a desktop computer, a virtual reality apparatus, an augmented reality apparatus, a handheld portable device (for example, a detector having a wireless communications function, a smart camera, a smart video camera), or the like, or may be a mobile phone 200 shown in FIG. 1 or FIG. 2. A specific form of the terminal is not particularly limited in this application.

A mobile phone is used as an example in the following embodiment to describe how the terminal implements specific technical solutions in the embodiment. As shown in FIG. 1 or FIG. 2, a terminal in this application may be a mobile phone 200. FIG. 1A and FIG. 1B are a schematic diagram of an appearance of the mobile phone 200. FIG. 1A is a schematic front surface view of the mobile phone 200, and FIG. 1B is a schematic back surface view of the mobile phone 200. The mobile phone 200 is used as an example below to describe the embodiment in detail.

It should be understood that, the mobile phone 200 shown in the figure is merely an example of the terminal, and the mobile phone 200 may include more components or fewer components than those shown in the figure, or two or more components may be combined, or different components may be used. The components shown in FIG. 2 may be implemented in hardware, software, or a combination of hardware and software that includes one or more signal processing and/or application-specific integrated circuits.

As shown in FIG. 2, the mobile phone 200 includes components such as a radio frequency (RF) circuit 210, a memory 220, an input unit 230, a display unit 240, a sensor 250, an audio circuit 260, a Wireless Fidelity (Wi-Fi) module 270, a processor 280, and a power supply 290. A person skilled in the art may understand that a structure of the mobile phone shown in FIG. 2 does not constitute a limitation on the mobile phone, and the mobile phone may include more components or fewer components than those shown in the figure, or some components may be combined, or a different component deployment may be used.

The following specifically describes each component of the mobile phone 200 with reference to FIG. 2.

The RF circuit 210 may be configured to receive and send a signal in an information receiving and sending process or a call process, may receive downlink information from a base station, then deliver the downlink information to the processor 280 for processing, and additionally, send related uplink data to the base station. Usually, the RF circuit includes but is not limited to, devices such as an antenna, at least one amplifier, a transceiver, a coupler, a low noise amplifier, a duplexer, and the like. In addition, the RF circuit 210 may further communicate with a network and another mobile device through wireless communication. The wireless communication may use any communications standard or protocol, which includes but is not limited to the global system for mobile communications, general packet radio service, code division multiple access, wideband code division multiple access, Long Term Evolution, 5th generation mobile communications system (5th generation wireless systems), email, short message service, and the like.

The memory 220 may be configured to store a software program and data. The processor 280 runs the software program and the data stored in the memory 220, to execute functions and data processing that are of the mobile phone 200. The memory 220 may mainly include a program storage area and a data storage area. The program storage area may store an operating system, an application program required by at least one function (such as a sound play function and an image display function), and the like. The data storage area may store data (such as audio data and an address book) created based on use of the mobile phone 200, and the like. In addition, the memory 220 may include a high-speed random access memory, and may further include a non-volatile memory, for example, at least one magnetic disk storage device, a flash memory, or other volatile solid-state storage devices. In the following embodiments, the memory 220 stores an operating system that can run on the mobile phone 200, for example, an iOS® operating system developed by Apple Inc., an Android® open source operating system developed by Google Inc., or a Windows® operating system developed by Microsoft Inc.

The input unit 230 (such as a touchscreen) may be configured to receive the entered digit or character information, and generate a signal input related to the user setting and function control that are of the mobile phone 200. Specifically, the input unit 230 may include a touch panel 231 disposed on a front surface of the mobile phone 200 and shown in FIG. 1, may collect a touch operation of a user that is on or close to the touch panel 231 (such as an operation of the user on or close to the touch panel 231 by using any suitable object or accessory such as a finger or stylus), and drive a corresponding connection apparatus based on a preset program. In one embodiment, the touch panel 231 may include two parts: a touch detection apparatus and a touch controller (not shown in FIG. 2). The touch detection apparatus detects a touch position of the user, detects a signal generated by the touch operation, and transmits the signal to the touch controller. The touch controller receives touch information from the touch detection apparatus, converts the touch information into touch point coordinates, and sends the touch point coordinates to the processor 280. Moreover, the touch controller can receive and execute an instruction sent by the processor 280. In addition, the touch panel 231 may be implemented by using various types, such as a resistive type, a capacitance type, an infrared type, and a surface sound wave type.

The display unit 240 (namely, a display screen) may be configured to display information input by the user or information provided to the user, and graphical user interfaces (GUI) of menus of the mobile phone 200. The display unit 240 may include a display panel 241 disposed on the front surface of the mobile phone 200. The display panel 241 may be configured in a form of a liquid crystal display, an organic light-emitting diode, or the like. The display unit 240 is configured to execute functions of the display screen in this application, for example, displaying the application interface, displaying the message, and the like.

As shown in FIG. 1A and FIG. 1B, in some embodiments, the mobile phone 200 may include a front surface A and a back surface B. Three optical touch keys 101, 102, and 103 may be disposed at the bottom of the front surface A, the touch panel 231 and the display panel 241 may further be disposed, and the touch panel 231 may cover the display panel 241. After detecting a touch operation that is on or close to the touch panel 231, the touch panel 231 transmits the touch operation to the processor 280, to determine a touch event. Subsequently, the processor 280 provides a corresponding visual output on the display panel 241 based on a type of the touch event. Although, in FIG. 2, the touch panel 231 and the display panel 241 are used as two independent components to implement input and output functions of the mobile phone 200, in some embodiments, the touch panel 231 and the display panel 241 may be integrated to implement the input and output functions of the mobile phone 200. The integrated touch panel 231 and display panel 241 may be referred to as a touch display screen for short.

In some other embodiments, a pressure sensor may further be disposed on the foregoing touch panel 231. In this way, when the user performs a touch operation on the foregoing touch panel, the touch panel can further detect pressure of the touch operation, so that the mobile phone 200 can more accurately detect the touch operation.

The mobile phone 200 may further include at least one sensor 250 such as an optical sensor, a motion sensor, and other sensors. Specifically, as shown in FIG. 1A, the optical sensor may include an ambient optical sensor 251 and an optical proximity sensor 252. The ambient optical sensor 251 may adjust luminance of the display panel 241 based on luminance of ambient light. The optical proximity sensor 252 is disposed on the front surface of the mobile phone 200. When the mobile phone 200 moves to an ear, the mobile phone 200 switches off a power supply of the display panel 241 based on the detection of the optical proximity sensor 252. In this way, electricity of the mobile phone 200 may further be stored. As one type of the motion sensor, an acceleration sensor 255 may detect magnitude of acceleration in various directions (for example, three axes and six axes), may detect magnitude and a direction of the gravity when the mobile phone 200 is static, and may be applicable to an application that recognizes a gesture of the mobile phone (for example, switching between landscape orientation and portrait orientation, a related game, and magnetometer gesture calibration), a function related to vibration recognition (such as a pedometer and a knock), and the like. For other sensors such as a gyroscope, a barometer, a hygrometer, a thermometer, and an infrared sensor that may further be configured for the mobile phone 200. Details are not described again. As shown in FIG. 1A, a front-facing camera 253 may be disposed at the top of the front surface of the mobile phone 200, and a rear-facing camera 254 may be disposed at the top of the back surface of the mobile phone 200. The motion sensor is configured to execute the function of detecting the motion manner of the terminal in this application.

The audio circuit 260, a speaker 261, and a microphone 262 may provide an audio interface between the user and the mobile phone 200. The audio circuit 260 may convert received audio data into an electrical signal and transmit the electrical signal to the speaker 261. The speaker 261 converts the electrical signal into a sound signal for output. On the other hand, the microphone 262 converts a collected sound signal into an electrical signal. The audio circuit 260 receives and converts the electrical signal into audio data, and then outputs the audio data to the RF circuit 210, to send the audio data to, for example, another mobile phone, or outputs the audio data to the memory 220 for further processing.

Wi-Fi is a short-distance wireless transmission technology. The mobile phone 200 may help, by using the Wi-Fi module 270, the user receive and send an email, browse a web page, access streaming media, and the like. Wi-Fi provides wireless broadband Internet access for the user.

The processor 280 is a control center of the mobile phone 200, and is connected to parts of the whole mobile phone by using interfaces and lines. The processor 280 executes functions and data processing of the mobile phone 200 by running or executing the software program stored in the memory 220, and invoking the data stored in the memory 220, thereby performing overall monitoring on the mobile phone. In some embodiments, the processor 280 may include one or more processing units; and the processor 280 may further integrate an application processor and a modem processor, where the application processor mainly processes an operating system, a user interface, an application program, and the like, and the modem processor mainly processes wireless communication. It may be understood that, the foregoing modem processor may also not be integrated into the processor 180.

A Bluetooth module 281 is configured to exchange information with another device by using a short-distance communication protocol such as Bluetooth. For example, the mobile phone 200 may establish, by using the Bluetooth module 281, a Bluetooth connection to a wearable electronic device (such as a smartwatch) also having a Bluetooth module, to exchange data.

The mobile phone 200 further includes the power supply 290 (such as a battery) for supplying power to the components. The power supply may be logically connected to the processor 280 by using a power management system, thereby implementing functions such as charging, discharging, and power consumption management by using the power management system. It may be understood that, in the following embodiments, the power supply 290 may be configured to supply power to the display panel 241 and the touch panel 231.

Methods in the following embodiments may all be implemented in the mobile phone 200 having the foregoing hardware structure.

A placement manner of the terminal in this application includes but is not limited to a horizontal placement, a vertical placement, or an inclined placement, and a body gesture of the terminal includes but is not limited to a landscape mode placement or a portrait mode placement. For example, the description of the terminal horizontally placed in the landscape mode may also be applicable to the terminal vertically placed in the portrait mode.

By means of the method provided in this application, when the terminal displays an application interface, if the terminal receives a message, a prompt of the message is displayed on the application interface, and an input of the user for the message is received. In response to the input, the display of the prompt of the message is canceled, only the application interface is displayed and the message is processed, so that the user may quickly process the message without affecting a current operation. Because the message is processed, it is convenient for the user to perform a subsequent search, and the user may quickly view the message that the user wants to view.

This application provides a message processing method, applied to a terminal having a display screen. When an application interface (such as a game interface) is displayed on the display screen of the terminal, a message comes, in this time, the user may fail to stop to process the message or the user may be inconvenient to touch the display screen. In this case, the user may process the message by using operations such as shaking and rotating a terminal body. Processing the message includes but is not limited to: storing the message in a preset interface; or, marking the message; or, adjusting a location of the message; or, performing an assortment on the message; or a combination of these processing manners, for example, performing the assortment on the message when marking the message.

Figure 3:
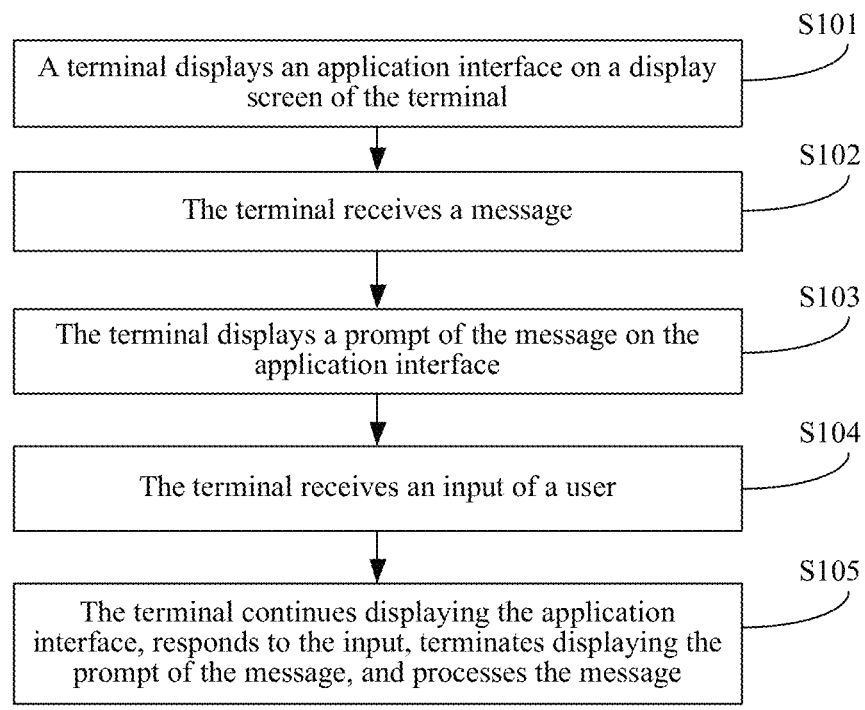
FIG. 3 is a schematic flowchart 1 of a message processing method according to an embodiment of this application.

Referring to FIG. 3, the message processing method includes the following operations.

S101: A terminal displays an application (APP) interface on a display screen of the terminal.

Specifically, the application interface may include, but is not limited to: a video play interface, an audio play interface, an instant messaging application interface, a news application interface, a novel reading interface, a shopping interface, a display ticketing interface, or a game interface.

S102: The terminal receives a message.

This application does not limit a type of the message, and the message may include, but is not limited to a text, a voice, a picture, a video, an emoticon, a notification, a short message service message, an email, an instant messaging message (for example, Fetion, Easychat, WeChat, QQ, Facebook Messenger, Viber, BlackBerry Messenger, Skype, Google Talk, WhatsApp, Telegram), and the like.

S103: The terminal displays a prompt of the message on the application interface.

The prompt of the message may include: a part or all of content of the message, or a character description or graphical representation of receiving a new message, or the like. The implementation provides possible forms of the prompt of the message.

Figure 4:
FIG. 4 is a schematic diagram of displaying a message on an application interface according to an embodiment of this application.

Specifically, referring to FIG. 4, the terminal receives the message when displaying the application interface, and the prompt of the message is displayed on the application interface displayed on the display screen. The application interface may be a plurality of application interfaces displayed in split screens, or may be one application interface displayed in full screen.

S104: The terminal receives an input of a user.

The input of the user may include: shaking the terminal in a manner, using expressions and actions, blinking, smiling, voicing, knocking on a back surface of a mobile phone for several times, sliding a prompt box of the message (a sliding direction is not limited, and may be set based on a requirement), pressing a fingerprint sensor, and the like. This implementation provides possible forms of the input of the user.

The method in this application is described mainly by using an example in which the user shakes the terminal in a manner, so that the terminal detects that the terminal moves in a first manner. Other forms of the input of the user are also applicable to the protection scope of this application.

In one embodiment, the terminal may alternatively detect, in first preset duration, that the terminal moves in the first manner. The first preset duration refers to time in which timing starts when the message is received from the terminal and the prompt of the message is displayed on the display screen of the terminal, and the time is less than and equal to the time in which the prompt of the message is displayed. The implementation may avoid long-time detection.

The terminal detects the motion manner of the terminal body by mainly using a motion sensor (for example, an acceleration sensor). From a top view, when the terminal is horizontally placed in a landscape mode and the screen faces right above, after the terminal moves in various manners, signals collected by a three-axis acceleration sensor are used as an example for description. After obtaining the foregoing signal from the three-axis acceleration sensor, a processor of the terminal may accordingly determine a manner in which the terminal moves.

Figure 5:
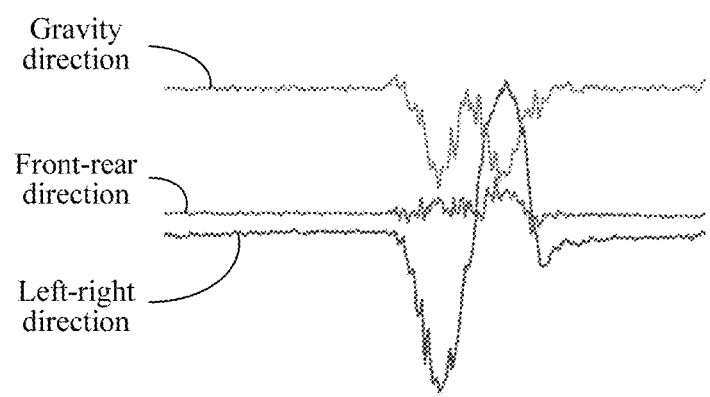
FIG. 5 is a schematic structural diagram 1 of a signal output by a three-axis acceleration sensor according to an embodiment of this application.
Figure 6:
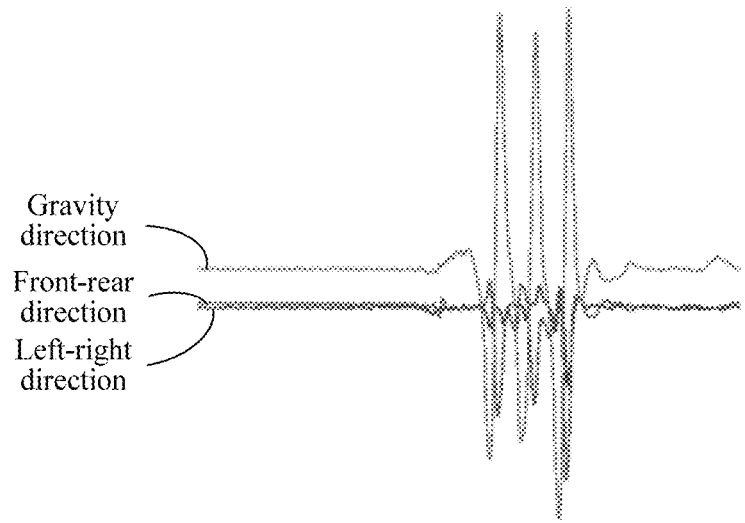
FIG. 6 is a schematic structural diagram 2 of a signal output by a three-axis acceleration sensor according to an embodiment of this application.
Figure 7:
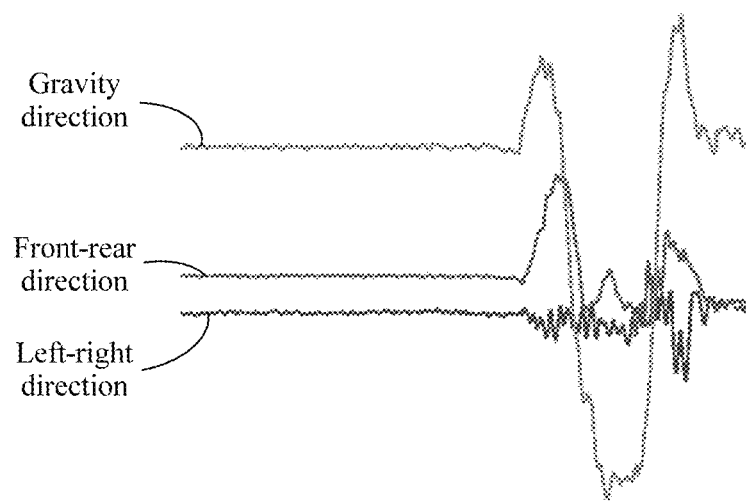
FIG. 7 is a schematic structural diagram 3 of a signal output by a three-axis acceleration sensor according to an embodiment of this application.

FIG. 5 is a signal diagram output by the three-axis acceleration sensor when the terminal first rotates anticlockwise and then rotates clockwise. A horizontal axis is a timeline, and a vertical axis is a signal strength axis. It may be learned from the figure that signal change in a left-right direction is large, and signal changes in a gravity direction and a front-rear direction are relatively small. FIG. 6 is a signal diagram output by the three-axis acceleration sensor when the user knocks a front surface or a back surface of the terminal for three times (that is, the terminal vibrates three times along the gravity direction). It may be learned from the figure that the signal change in the gravity direction is large, and the signal changes in the left-right direction and the front-rear direction are relatively small. FIG. 7 is a signal diagram output by the three-axis acceleration sensor when the terminal changes from a horizontal placement to a vertical placement.

It should be noted that the first manner in this application includes but is not limited to the foregoing motion manners, and possible implementations may be described subsequently by using an example.

S105: The terminal continues displaying the application interface, responds to the input, terminating displays the prompt of the message, and processes the message.

In this case, the terminal continues displaying the application interface in response to the input that is of the user and that indicates that the prompt of the message is not displayed, so that the user may continue to perform an operation on an original application interface.

It should be noted that the preset interface includes but is not limited to: a notification center interface, a drop-down list, an unlock screen interface, a lock screen interface, a notification interface, and the like. For that the message is stored in the preset interface, a default storage directory of the message is different from the preset interface, and the preset interface is located in independent storage space. For example, for a WeChat message, a default storage directory of the WeChat message is in storage space corresponding to the WeChat application, and the foregoing preset interface may be located in the independent storage space. The messages stored in the preset interface may include: content that can be read by the terminal (for example, a short message service message or other information that can be decoded by a system). For an encrypted message within an application, a prompt of the information and a link for jumping to an interaction interface of a corresponding APP may be stored.

Figure 8:
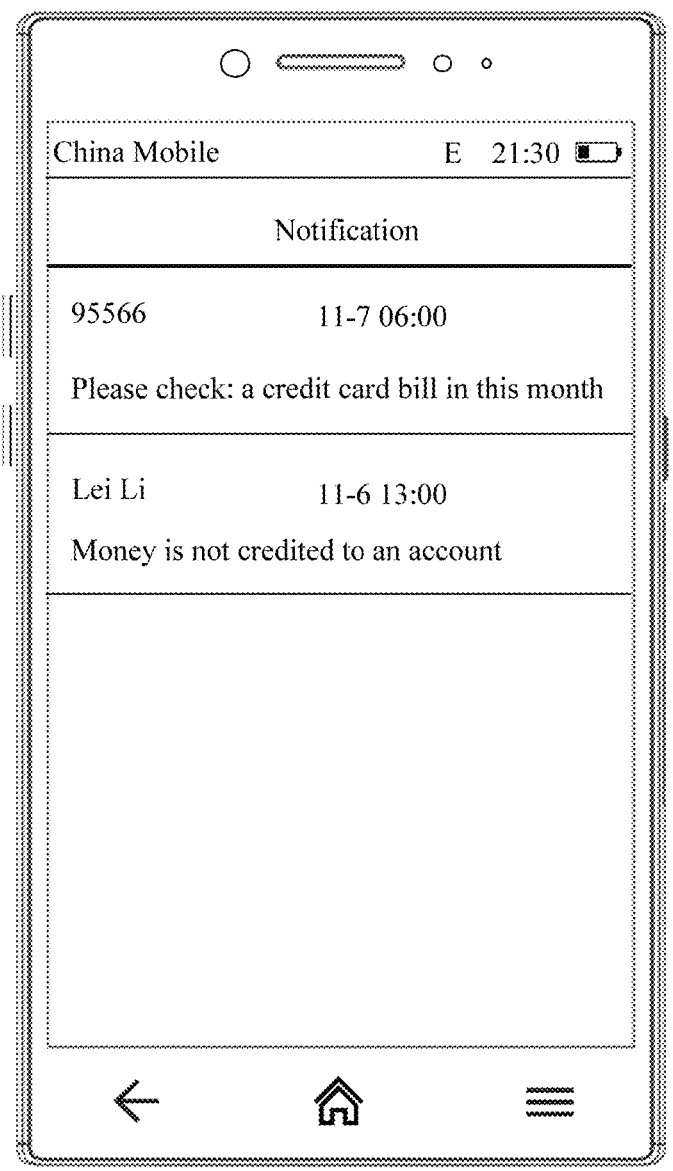
FIG. 8 is a schematic diagram of a preset interface according to an embodiment of this application.
Figure 9A:
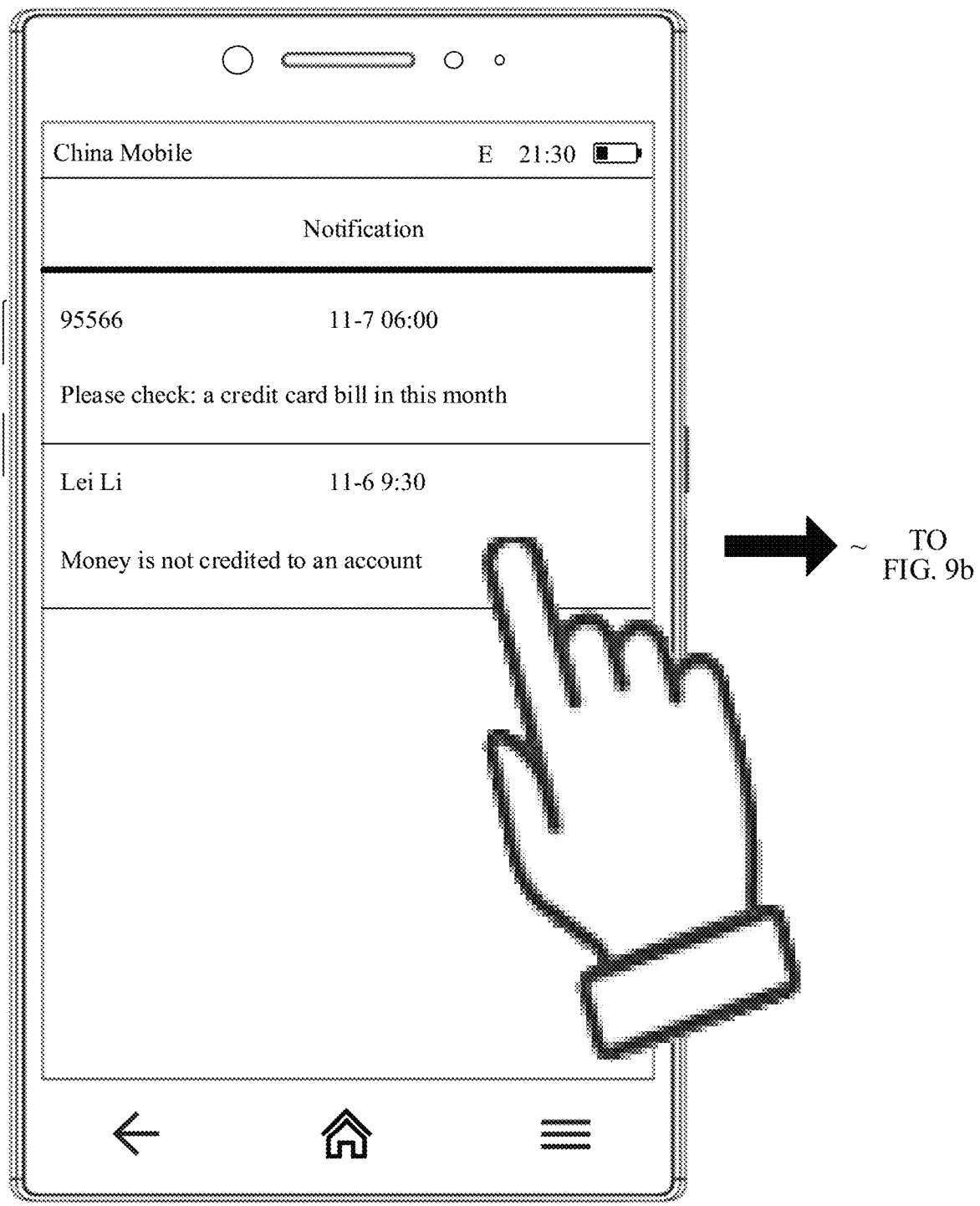
FIG. 9a and FIG. 9b are a schematic diagram of an interaction interface for jumping to a corresponding application by tapping a message according to an embodiment of this application.
Figure 9B:

FIG. 8 shows a possible implementation of the preset interface. It should be noted that, a specific presentation form of the preset interface is not limited in this application. For example, the specific presentation form may be similar to a call record, a short message service message, a WeChat or QQ interaction interface, a reminded event, or the like. Referring to FIG. 9*a* and FIG. 9*b*, in the preset interface, a link of a corresponding application may be stored when the message is stored, so that when the corresponding message is tapped, an interaction interface of the corresponding application may be directly jumped to. In addition, it should be noted that the storing the message in the preset interface in this application means storing the message in a storage area corresponding to the preset interface. The preset interface is not necessarily displayed when the message is stored, so that the user can view the preset interface in another time without affecting a current operation of the user.

The foregoing content describes storing the message in the preset interface, and for the user, it may be inconvenient to view the message or may not be intuitive. Therefore, the message may be marked. A form of marking the message may include, but is not limited to at least one of the following manners: marking the message when the prompt of the message is displayed, or, marking the message in a lock screen interface or an unlock screen interface; or, marking the message in a notification center interface.

Figure 10:
FIG. 10 is a schematic diagram 1 of marking a message according to an embodiment of this application.
Figure 11:
FIG. 11 is a schematic diagram 2 of marking a message according to an embodiment of this application.

For example, FIG. 10 and FIG. 11 each are a schematic diagram of marking a message when a prompt of the message is displayed. FIG. 10 shows a message marked with a flag, and FIG. 11 shows a message marked with an exclamation mark. It should be noted that a specific marking manner includes but is not limited to the foregoing examples, and may further include: marks of other shapes, or color change, flashing, and jitter that are of a message box or message content, or the like. The implementation may allow the message to be marked more intuitively.

Figure 12:
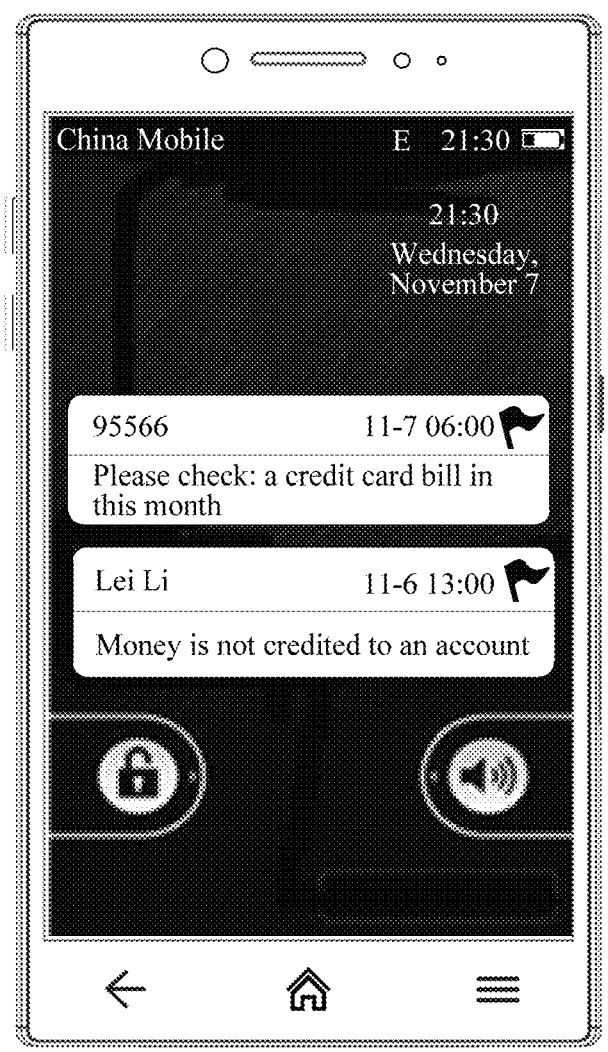
FIG. 12 is a schematic diagram 3 of marking a message according to an embodiment of this application.
Figure 13:
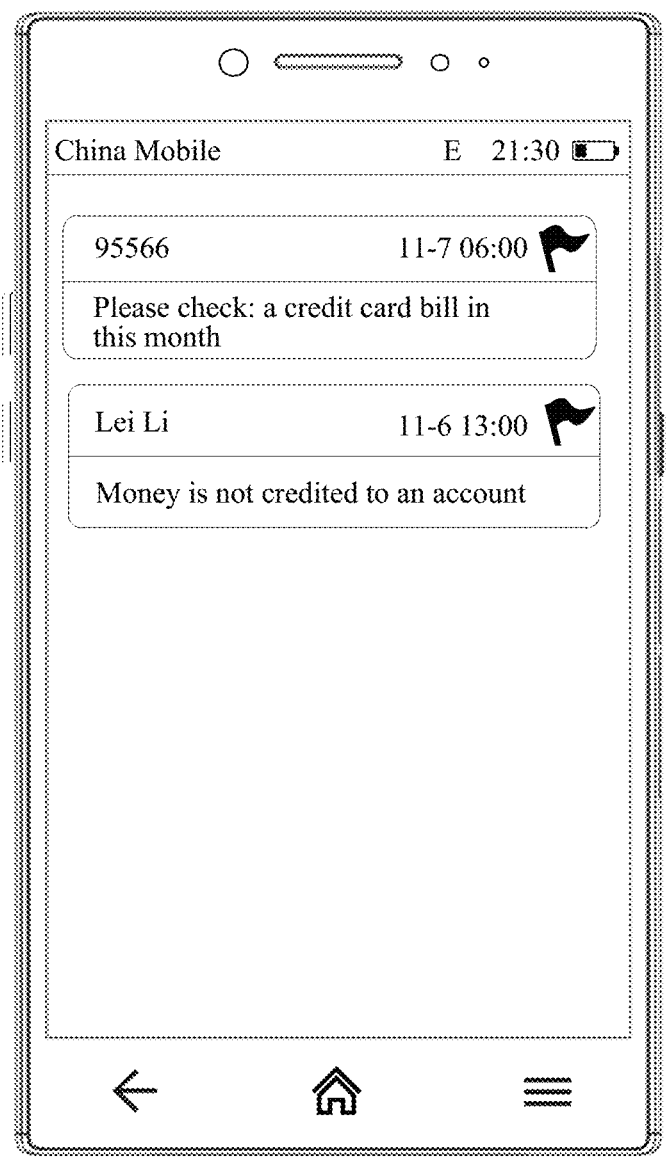
FIG. 13 is a schematic diagram 4 of marking a message according to an embodiment of this application.

For example, FIG. 12 and FIG. 13 each are a schematic diagram of marking a message in a notification center of a lock screen interface or an unlock screen interface. The notification center may include a pull-down display, a pull-up display, a centered display, or the like. FIG. 12 shows marking the message in the notification center displayed on the lock screen interface in a centered manner. FIG. 13 shows marking the message in the notification center displayed on the unlock screen interface in a pull-down manner.

For adjusting the location of the message, the marked message may be preferentially displayed on a current page in the notification center of the lock screen interface or the unlock screen interface, and an unmarked message is displayed later. The messages are not displayed based on a sequence of receiving time of the messages.

Figure 14:
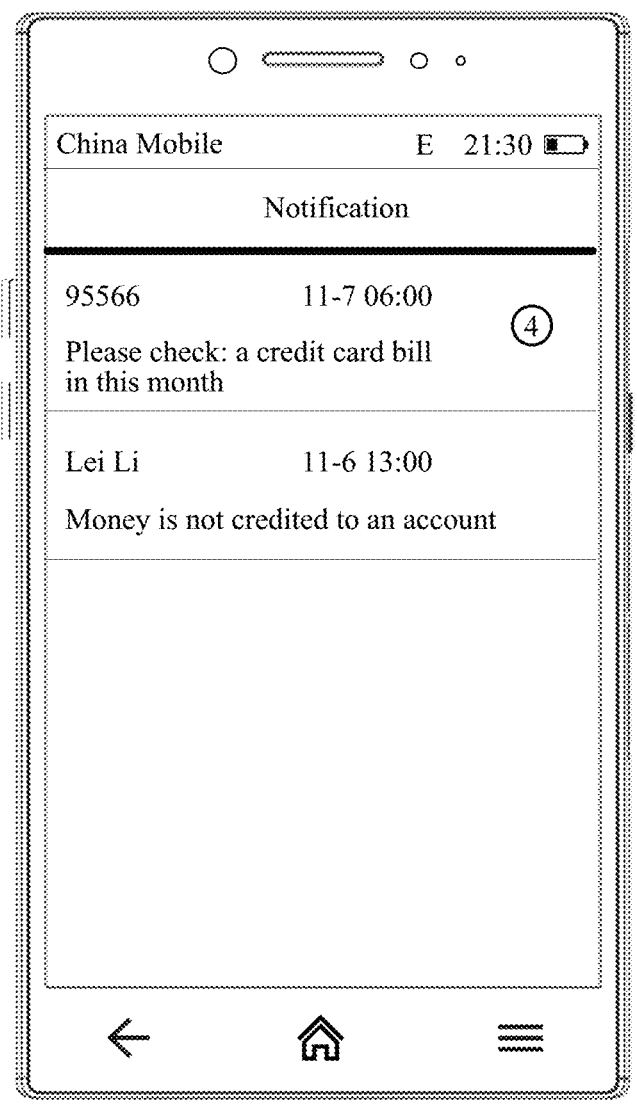
FIG. 14 is a schematic diagram of performing an assortment on a message according to an embodiment of this application.

The performing the assortment on the message may specifically include: performing the assortment on the message based on characteristic information of the message. The characteristic information of the message is used to identify a common characteristic of a plurality of messages, and the characteristic information includes at least one of a source, time, a date, a day of a week, a type, a size, duration, or a quantity of characters of the message. Referring to FIG. 14, the message may be assorted based on the source, and four messages from 95566 are assorted as one category.

The following describes the foregoing operations with reference to a specific example. It should be noted that a last figure (for example, FIG. 15E and FIG. 16D) in each group of accompanying drawings is used for intuitively displaying a result after the message is processed, and it does not indicate that content in the figure is to be displayed after the message is processed, and processing results obtained based on different processing manners are different. In addition, the first manner may be a combination of the following plurality of manners.

Figure 15A:
Figure 15B:
Figure 15E:
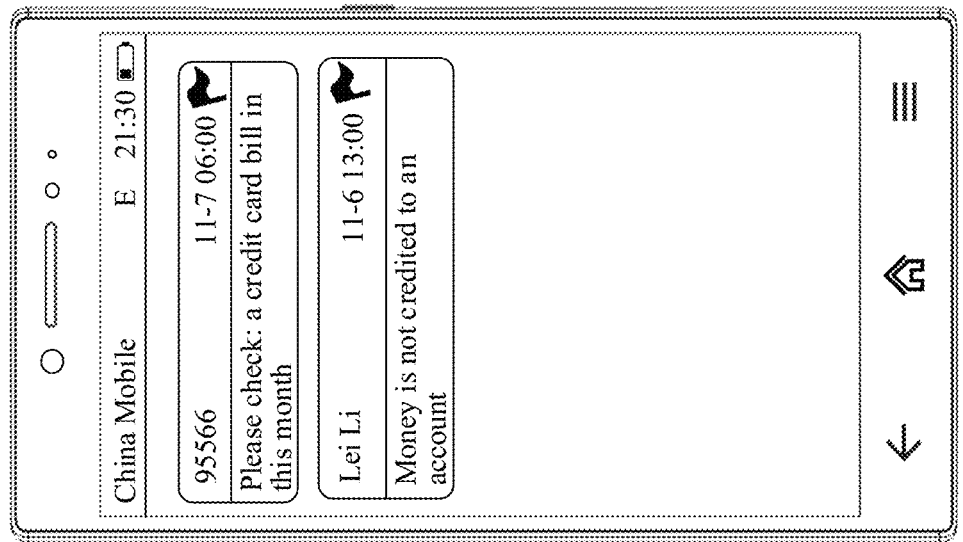

For example, FIG. 15A to FIG. 15E are a schematic diagram showing that when a terminal is horizontally placed in a landscape mode, the first manner is that the terminal is first rotated anticlockwise and then rotated clockwise. FIG. 15A is a schematic side view of the terminal when the terminal is horizontally placed; FIG. 15B is a schematic front view of the terminal while the terminal is placed in a landscape mode. When a user plays a game in full screen, the terminal receives a message and displays a prompt of the message on a display screen. FIG. 15C shows that the user rotates the terminal anticlockwise by a specific angle; and FIG. 15D shows that the user rotates the terminal clockwise by a specific angle. FIG. 15E shows that after moving in the manners shown in FIG. 15C and FIG. 15D, the terminal stores the message in a preset interface. It should be understood that, FIG. 15E is an interface when the user views the message. FIG. 15E may be automatically displayed after the terminal detects that the user exits the game; or FIG. 15E may be displayed when the terminal detects that the user manually views a notification center. The message in FIG. 15E may display a particular mark, and the message in FIG. 15B may also be arranged at front end of a notification page. It should be noted that the first manner may alternatively be that FIG. 15C is performed after FIG. 15D, that is, the rotation anticlockwise is performed after the rotation clockwise; or may be that only one or more of FIG. 15D or FIG. 15C is performed, that is, only the clockwise rotation is performed, only the rotation anticlockwise is performed, or FIG. 15D is performed twice.

Figure 16D:
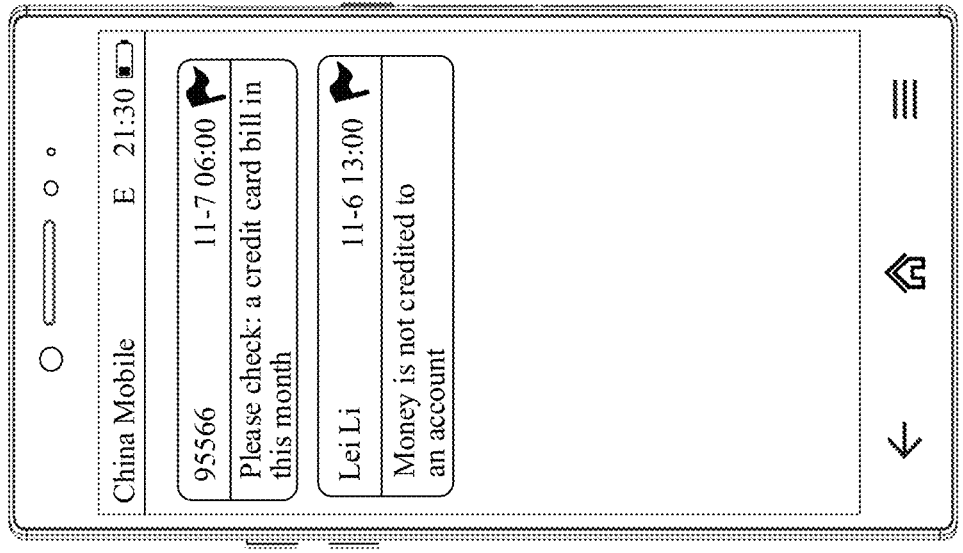

For example, FIG. 16A to FIG. 16D are a schematic diagram showing that when a terminal is horizontally placed in a landscape mode, the first manner is that an upper part of the terminal is rotated forward. FIG. 16A and FIG. 16B are the same as FIG. 15A and FIG. 15B. Details are not described again. FIG. 15C shows that the user rotates the upper part of the terminal forward by a specific angle; and FIG. 16D shows that after moving in the manner shown in FIG. 16C, the terminal stores the message in the preset interface. It should be understood that: FIG. 16D is an interface when the user views the message, and FIG. 16D may be automatically displayed after the terminal detects that the user exits the game; or FIG. 16D may be displayed when the terminal detects that the user manually views the notification center. In addition, the message in FIG. 16D may display a particular mark, and the message in FIG. 16B may also be arranged at the front end of the notification page. It should be noted that the first manner may alternatively be: rotating the upper part backward, rotating the lower part forward, rotating the lower part backward, rotating the left part forward, rotating the left part backward, rotating the right part forward, rotating the right part backward, or a combination of the foregoing manners.

Figure 17E:
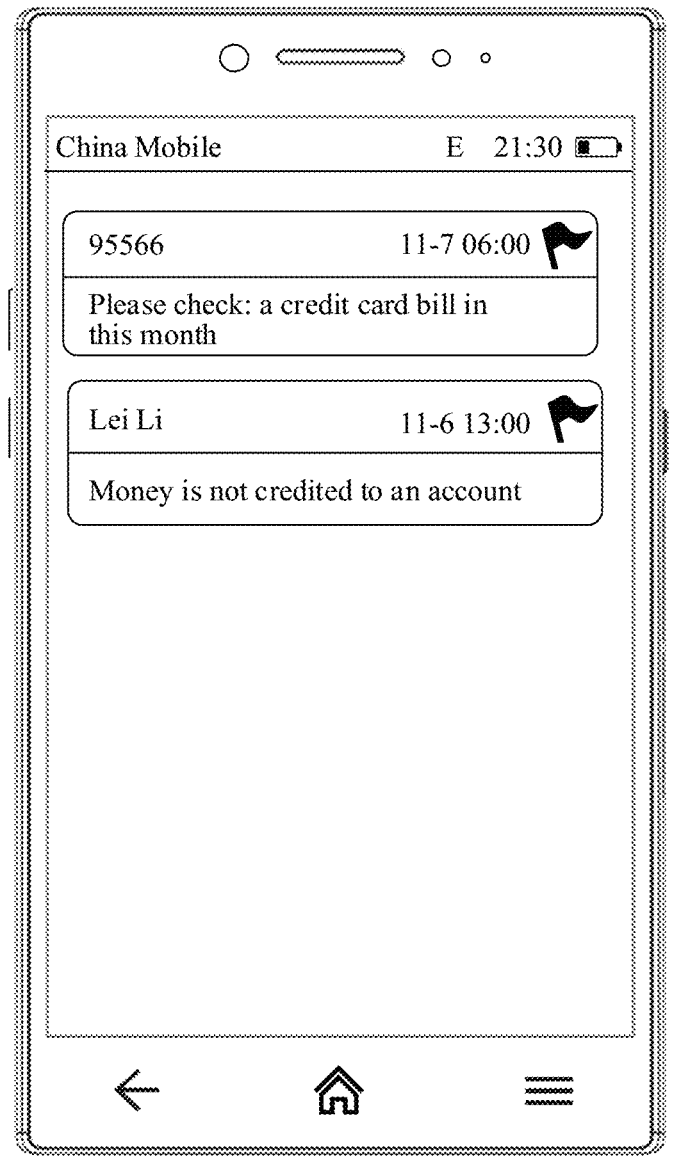

For example, FIG. 17A to FIG. 17E are a schematic diagram showing that when a terminal is horizontally placed in a landscape mode, the first manner is that the terminal moves upward after moving upward along a body plane direction. FIG. 17A and FIG. 17B are the same as FIG. 15A and FIG. 15B. Details are not described again. FIG. 17C shows that the user moves the terminal downward along the body plane direction; FIG. 17D shows that the user moves the terminal upward along the body plane direction; and FIG. 17E shows that after moving in the manner shown in FIG. 17C and FIG. 17D, the terminal stores the message in the preset interface. It should be understood that: FIG. 17E is an interface when the user views the message, and FIG. 17E may be automatically displayed after the terminal detects that the user exits the game; or FIG. 17E may be displayed when the terminal detects that the user manually views the notification center. In addition, the message in FIG. 17E may display a particular mark, and the message in FIG. 17B may also be arranged at the front end of the notification page. It should be noted that the first manner may alternatively be that: FIG. 17C is performed after FIG. 17D, that is, the terminal moves downward after moving upward along the body plane direction; or, may also be that only one or more of FIG. 17D or FIG. 17C is performed, that is, the terminal only moves downward or only moves upward; or, may be that the terminal moves towards the left and the right along the body plane direction, moves upward and downward along a body vertical direction; or may be a combination of the foregoing manners. It should be noted that the first manner shown in FIG. 17A to FIG. 17E also includes a situation that the terminal vibrates in a specific manner, for example, the vibration caused by the user using fingers to sequentially knock on the terminal body for several times.

By means of the message processing method provided in this application, when an application interface is displayed, a message comes, and a prompt of the message is displayed on the application interface, displaying the prompt of the message is canceled by receiving the input of the user and only the application interface is redisplayed, at the same time, the message is processed. The user may continue to perform an operation on an original application interface, thereby implementing quick message processing without affecting the current operation.

Figure 18:
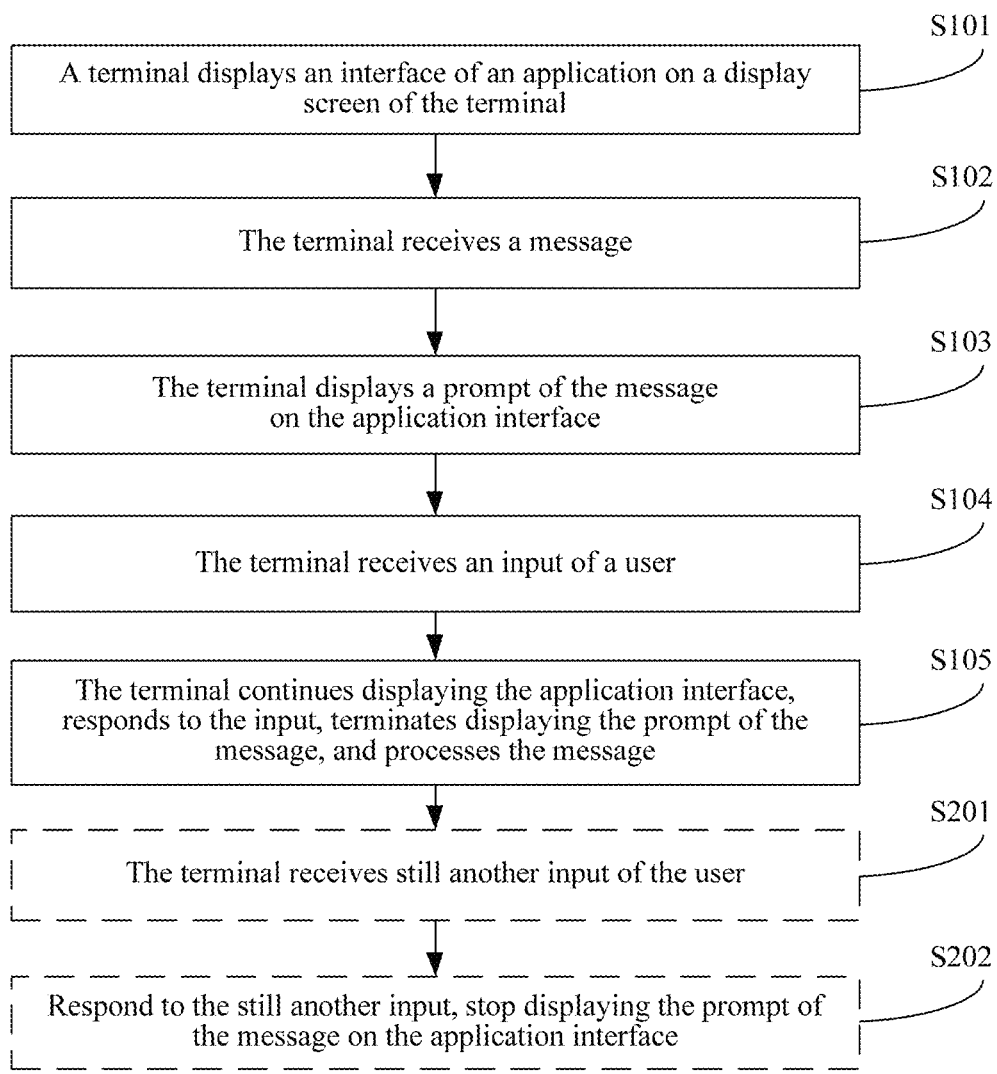
FIG. 18 is a schematic flowchart 2 of a message processing method according to an embodiment of this application.

It should be understood that: in S105, the terminal continues displaying the application interface, responds to the input, terminating displays the prompt of the message, and processes the message. As a possible implementation, a replacement implementation of S105 is that: the terminal continues displaying the application interface, responds to the input, and processes the message. That is, after the prompt of the message is displayed, the duration may need to be preset, so that the prompt of the message is terminating displayed, which may affect the operation of the current user during the period. Therefore, to quickly make the message terminating be displayed, the user may stop, through another operation, displaying the prompt of the message. In one embodiment, referring to FIG. 18, the foregoing method may further include operations S201 and S202.

S201: The terminal receives still another input of the user.

The still another input herein may be different from the input manner of operation S104, or may be, for example, that the user shakes the terminal in a manner, so that the terminal detects that the terminal moves in a second manner. The second manner herein refers to the motion manner that is in the foregoing motion manners and that is different from the first manner. For example, when the first manner is that the upper part of the terminal is rotated forward by an angle, the second manner may be that the upper part of the terminal is rotated backward by a specific angle, or may be another motion manner. It should be understood that: the second manner may also be the same as the first manner, and descriptions of the "first manner" and the "second manner" are merely used for distinction. In this specification, descriptions are made only by using that the first manner and the second manner are different, and technical solutions that the two manners are the same are not excluded. For example, both the first manner and the second manner are that the upper part of the terminal is rotated forward by a specific angle.

S202: Respond to the still another input, stop displaying the prompt of the message on the application interface.

Figure 19A:
FIG. 19A to FIG. 19D are a schematic diagram of canceling displaying a message by shaking a mobile phone according to an embodiment of this application.
Figure 19B:
Figure 19C:
Figure 19C:
Figure 19D:
Figure 19D:
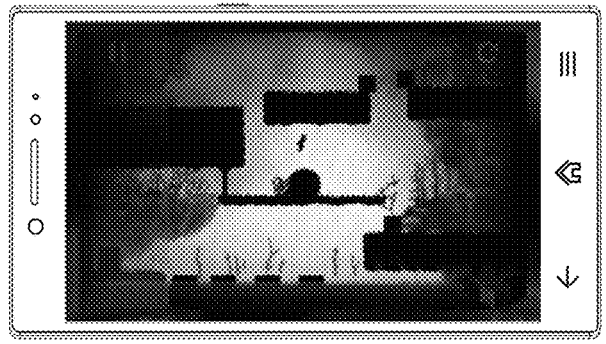

For example, referring to FIG. 19A to FIG. 19D, FIG. 19A and FIG. 19B are the same as FIG. 15A and FIG. 15B. Details are not described again. FIG. 19C shows that the user rotates the upper part of the terminal backward by a specific angle, and FIG. 19D shows that after moving in the manner shown in FIG. 19C, the terminal stops displaying the prompt of the message on the display screen.

The implementation implements canceling the prompt of the message without operating the screen.

Figure 20:
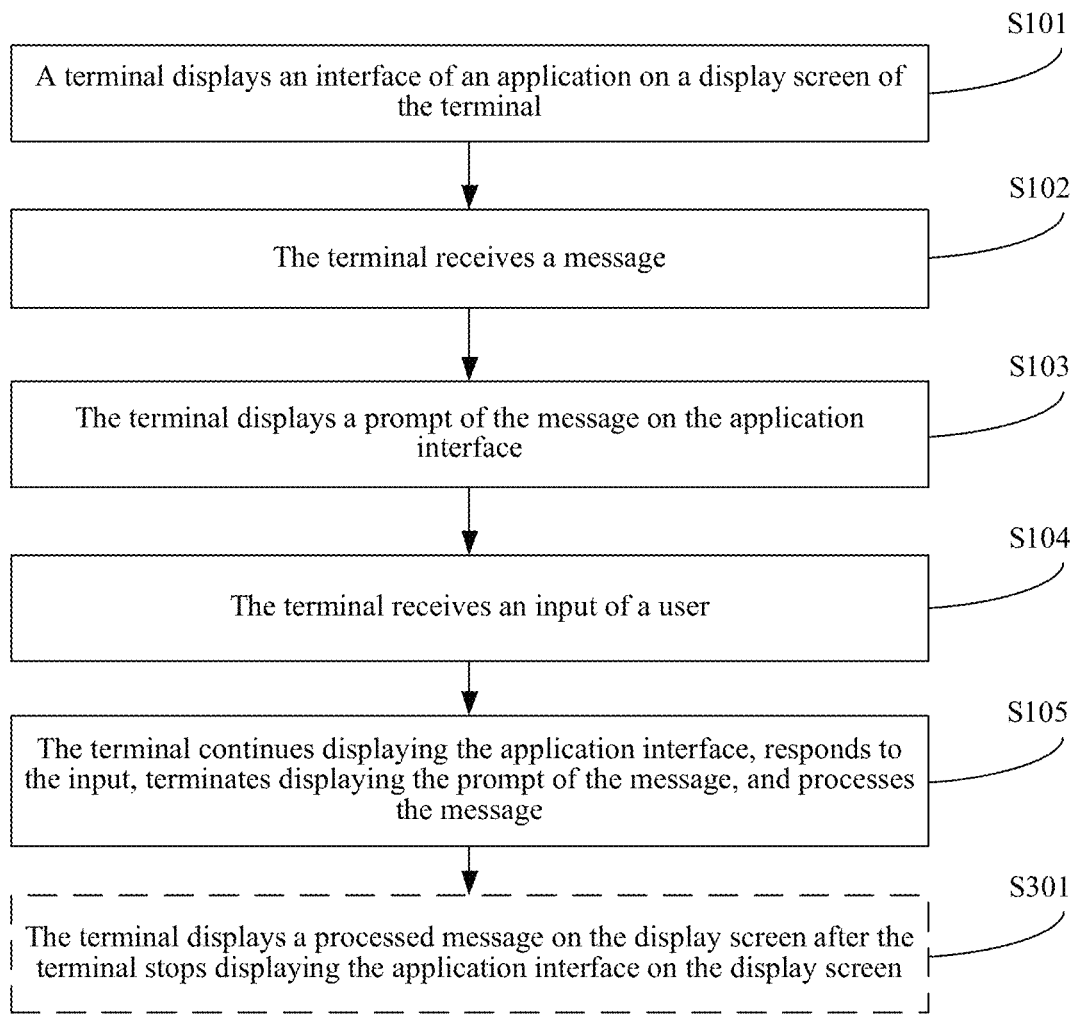
FIG. 20 is a schematic flowchart 3 of a message processing method according to an embodiment of this application.

After the message is processed, for ease of reminding the user, the user may be reminded again, after exiting the current application interface, that the message has been processed, and the time of reminding may be selected when the user does not use the terminal, or when the user uses another application. In one embodiment, referring to FIG. 20, the foregoing method may further include operation S301.

S301: The terminal displays the processed message on the display screen after the terminal stops displaying the application interface on the display screen.

Specifically, the processed message may be displayed directly as shown in FIG. 8, or the processed message is displayed based on a new organization form (for example, the message center shown in FIG. 12 or FIG. 13).

The operation may be understood as that after stopping displaying the application interface, the terminal immediately displays the processed message, or may display the processed message after a period of time. This application does not limit whether the application corresponding to the application interface is suspended or closed.

The implementation implements a message re-prompting function.

In one embodiment, after the terminal stops displaying the application interface on the display screen, the terminal may display, after third preset duration, the processed message on the display screen. The implementation may avoid long-time detection.

Figure 21:
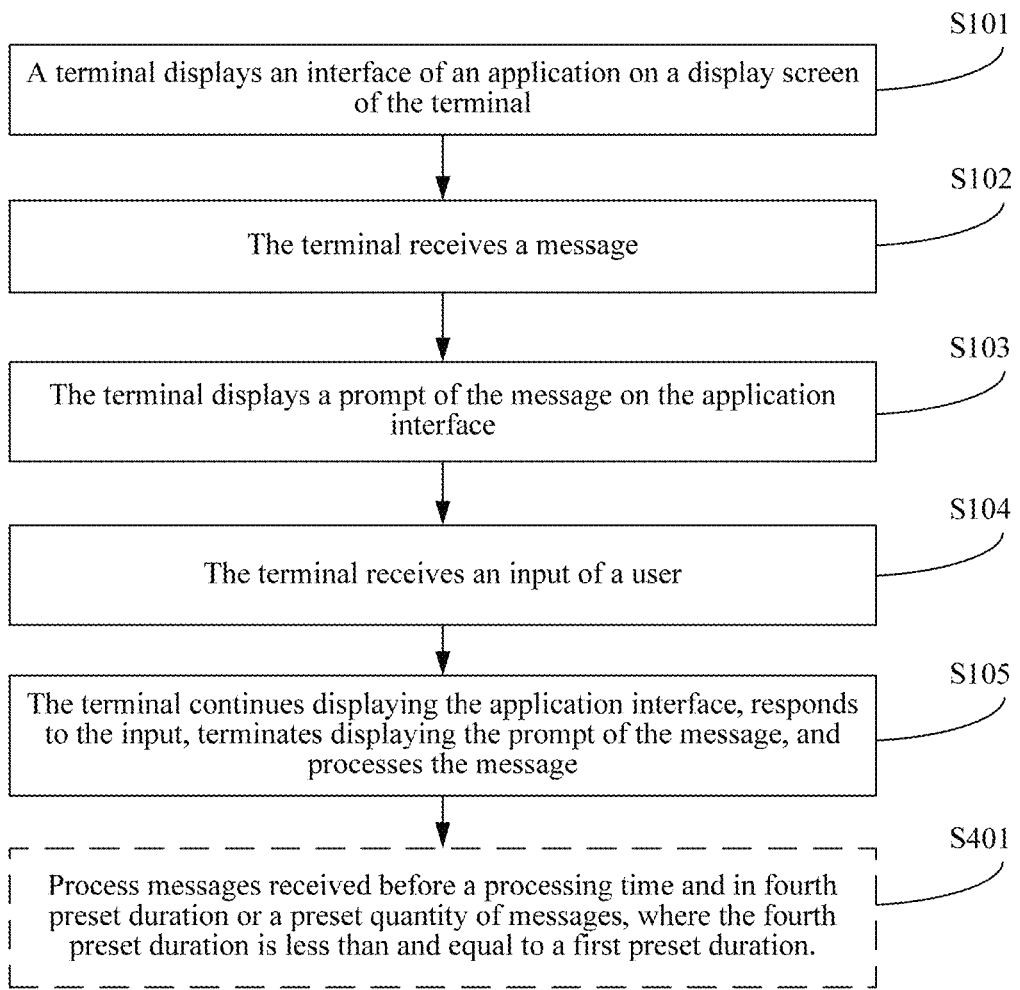
FIG. 21 is a schematic flowchart 4 of a message processing method according to an embodiment of this application.

Because there is a time difference between displaying the prompt of the message and receiving the input of the user, another message may be received and displayed during the period, in this case, all messages during the period may be processed, to prevent a message from being missed. In one embodiment, referring to FIG. 21, the foregoing method may further include operation S401.

S401: Process messages received before a processing time and in fourth preset duration or a preset quantity of messages, where the fourth preset duration is less than and equal to the first preset duration.

Specifically, that detect the motion manner of the terminal is used as an example, messages received before a time at which the terminal is detected to move in the first manner and in preset duration may be processed, or the preset quantity of messages before the time at which the terminal is detected to move in the first manner may be processed, for example, the messages are stored in the preset interface.

Figure 22A:
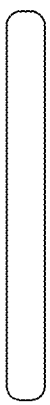
FIG. 22A to FIG. 22E are a schematic diagram 4 of processing a message by shaking a mobile phone according to an embodiment of this application.
Figure 22B:
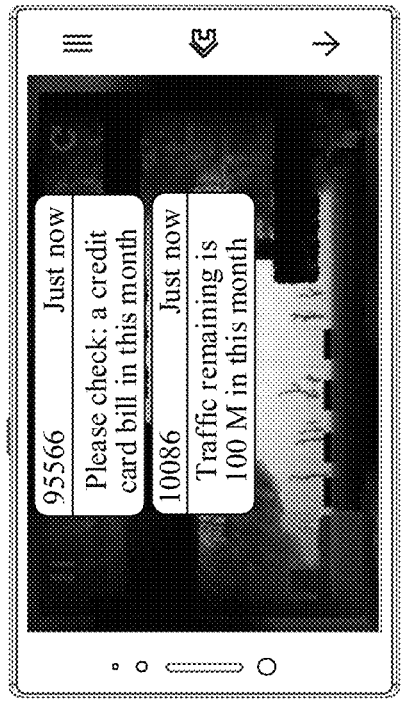
Figures 22C, 22D:
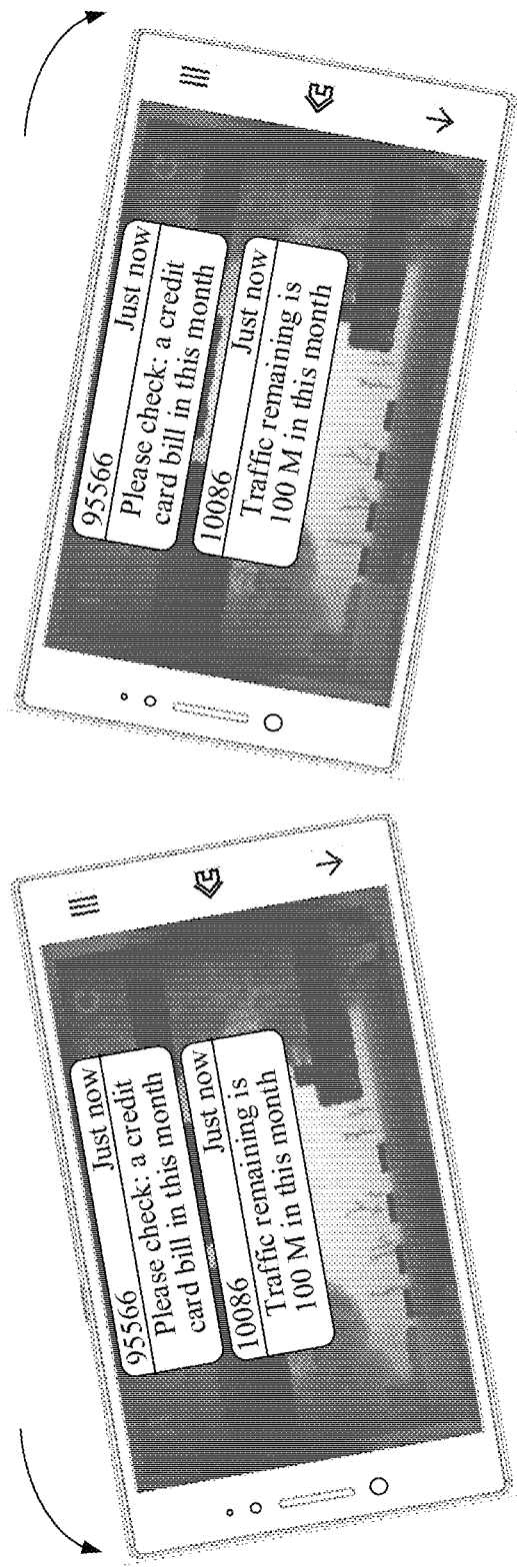
Figure 22E:
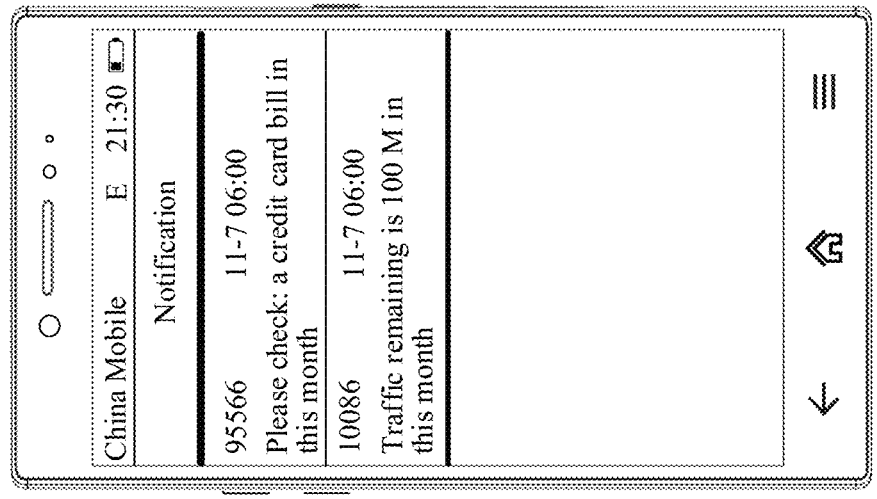

For example, it is assumed that the fourth preset duration is equal to the first preset duration, and referring to FIG. 22A to FIG. 22E, compared with FIG. 15A to FIG. 15E, FIG. 22A is the same as FIG. 15A. A difference between FIG. 22B and FIG. 15B is that after the message from 95566 is displayed, the message from 10086 is displayed again. The user expects to process the message from 95566, because the message from 10086 is also simultaneously displayed, and after the terminal moves in the first manner, the difference between FIG. 22E and FIG. 15E is that not only the message from 95566 is processed, but also the message from 10086 is processed. It should be understood that: FIG. 22E is an interface when the user views the message, and FIG. 22E may be automatically displayed after the terminal detects that the user exits the game; or FIG. 22E may be displayed when the terminal detects that the user manually views the notification center. In addition, the message in FIG. 17E may display a particular mark, and the message in FIG. 22B may also be arranged at the front end of the notification page.

Although the implementation may process the message that is not expected to be processed, it can be ensured that the message is not missed.

Figure 23:
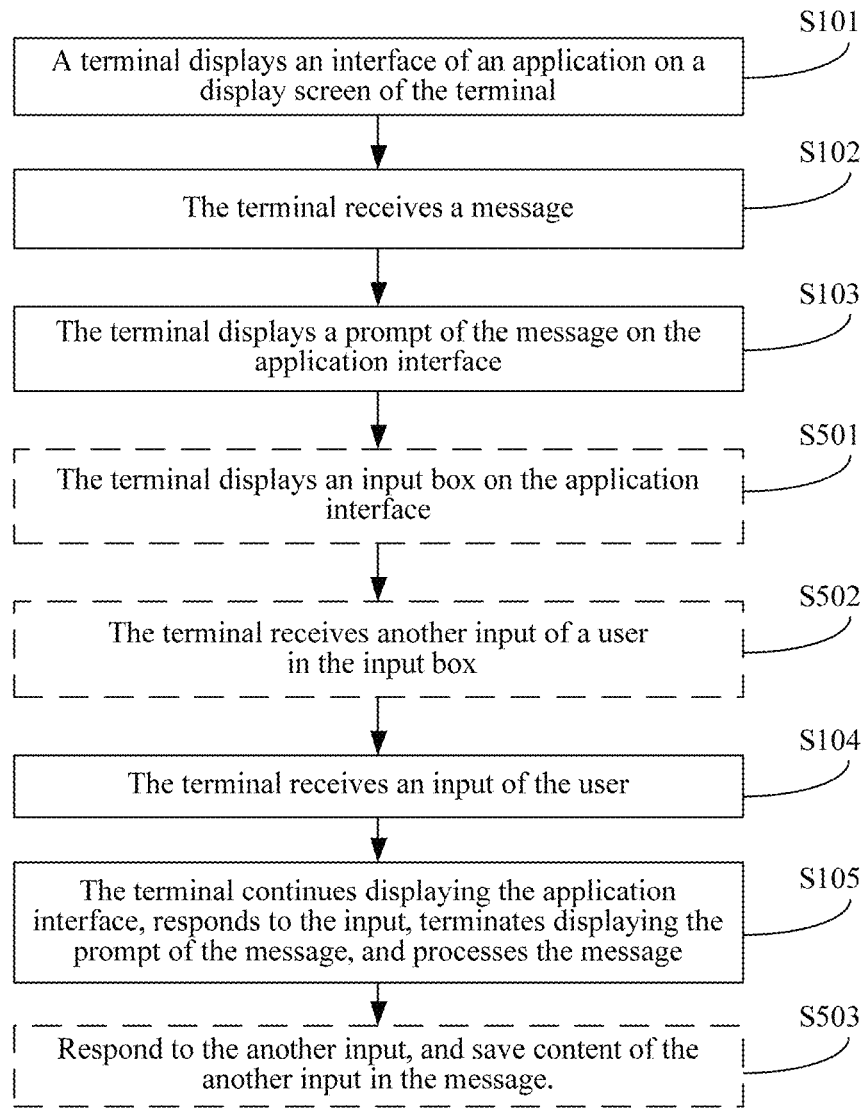
FIG. 23 is a schematic flowchart 5 of a message processing method according to an embodiment of this application.

In some cases, the user may think that content needing to be replied is relatively large or temporarily think of important content related to the message, but cannot record all of the content, the user may manually add a short comment or to-be-replied content, and further performs an edition when the user is free subsequently. In one embodiment, referring to FIG. 23, when the prompt of the message is displayed on the application interface in operation S103, the foregoing method may further include operations S501 and S502. When the message is processed in step S105, the foregoing method may further include operation S503.

S501: The terminal displays an input box on the application interface.

Specifically, the input box may be displayed after the terminal receives a touch operation performed by the user on the message, or the input box may be displayed together with the message. The touch operation may include, but is not limited to tap, slide, press, and the like. Specific details are not limited. The input box not only includes a character input, but may also include a voice input.

Figure 24B:
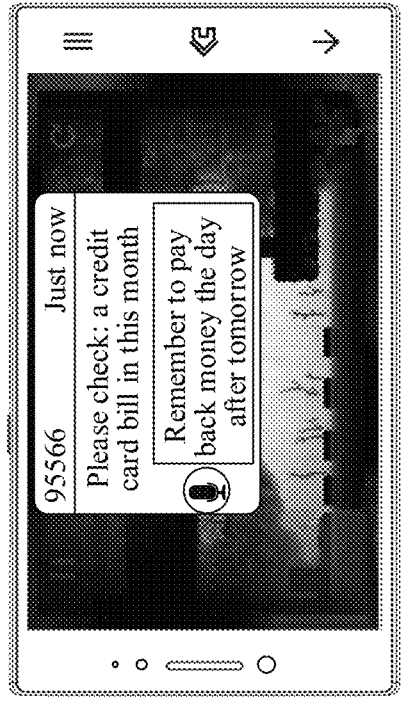
FIG. 24A to FIG. 24E are a schematic diagram 5 of processing a message by shaking a mobile phone according to an embodiment of this application.
Figure 24A:
Figures 24C, 24D:
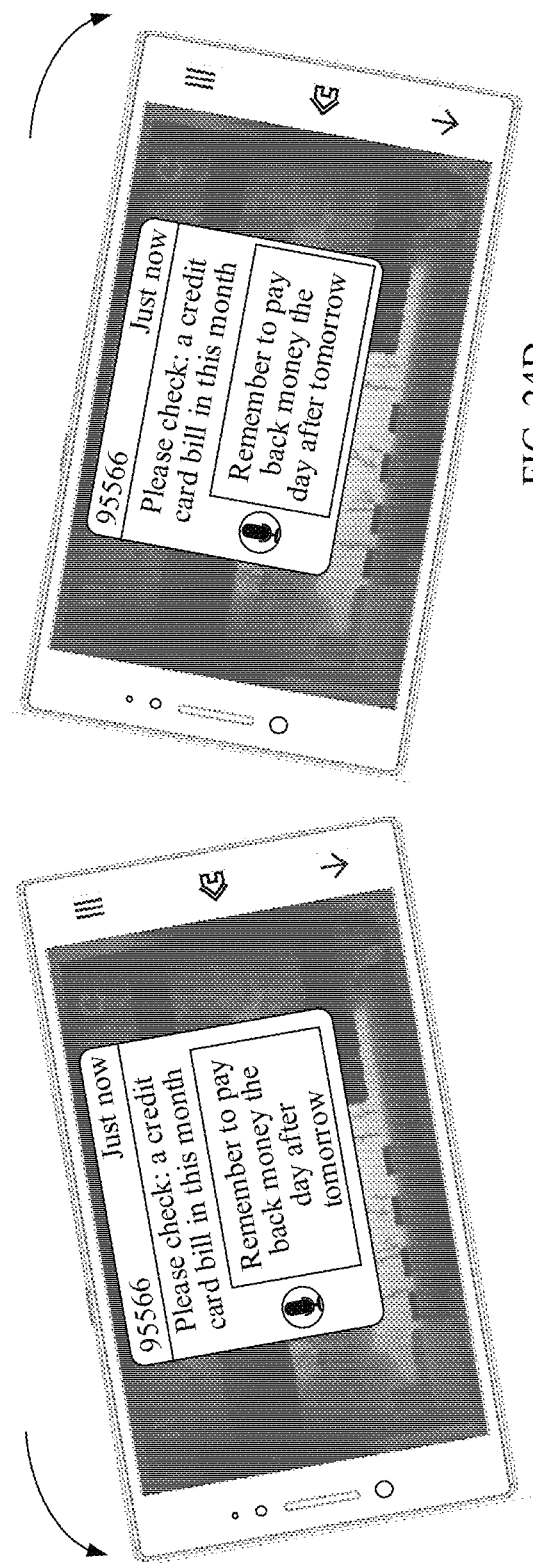

For example, referring to FIG. 24A to FIG. 24E, and compared with FIG. 15A to FIG. 15E, FIG. 24A is the same as FIG. 15A. A difference between FIG. 24B and FIG. 15B is that the input box is also displayed when the message is displayed.

S502: The terminal receives another input of the user in the input box.

The another input is similar to the still another input in operation S201 or the input in operation S104. Details are not described again.

For example, referring to FIG. 24A to FIG. 24E, a difference between FIG. 24B and FIG. 15B is that the input of the user may be received in the input box, for example, "remember to pay back the money the day after tomorrow".

S503: Respond to the another input, and store content of the another input in the message.

Figure 24E:
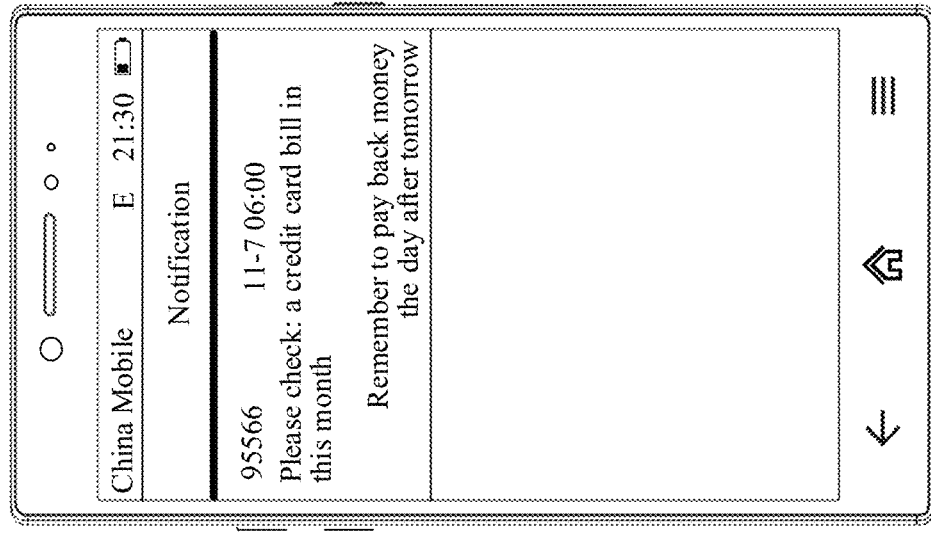

For example, referring to FIG. 24A to FIG. 24E, a difference between FIG. 24C, FIG. 24D and FIG. 15C, FIG. 15D is that when the terminal moves in the first manner, the input box and the content of the input box are also displayed. A difference between FIG. 24E and FIG. 15E is that not only the message is processed, but also the input content of the user is processed in the same way, for example, the input content is stored in the message. It should be understood that: FIG. 24E is an interface when the user views the message, and FIG. 24E may be automatically displayed after the terminal detects that the user exits the game; or FIG. 24E may be displayed when the terminal detects that the user manually views the notification center. In addition, the message in FIG. 24E may display a particular mark, and the message in FIG. 24B may also be arranged at the front end of the notification page.

The implementation implements adding a comment or reply content for the message.

Figure 25:
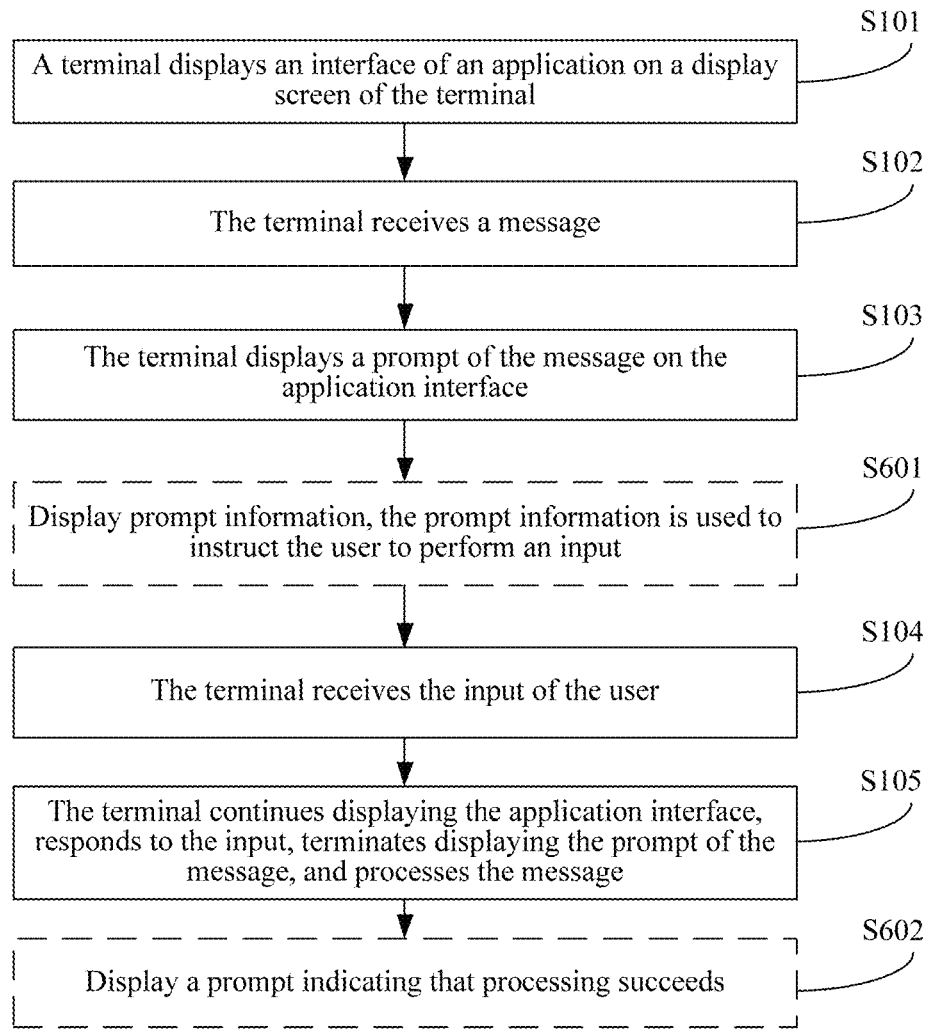
FIG. 25 is a schematic flowchart 6 of a message processing method according to an embodiment of this application.

To help the user to learn how to process the message through the input, and help the user to learn of the processing result, referring to FIG. 25, when the terminal displays the prompt of the message on the application interface in operation S103, the method may further include operation S601, and after the message is successfully processed in operation S105, the method may further include operation S602.

S601: Display prompt information, the prompt information is used to instruct the user to perform the input.

Figure 26:
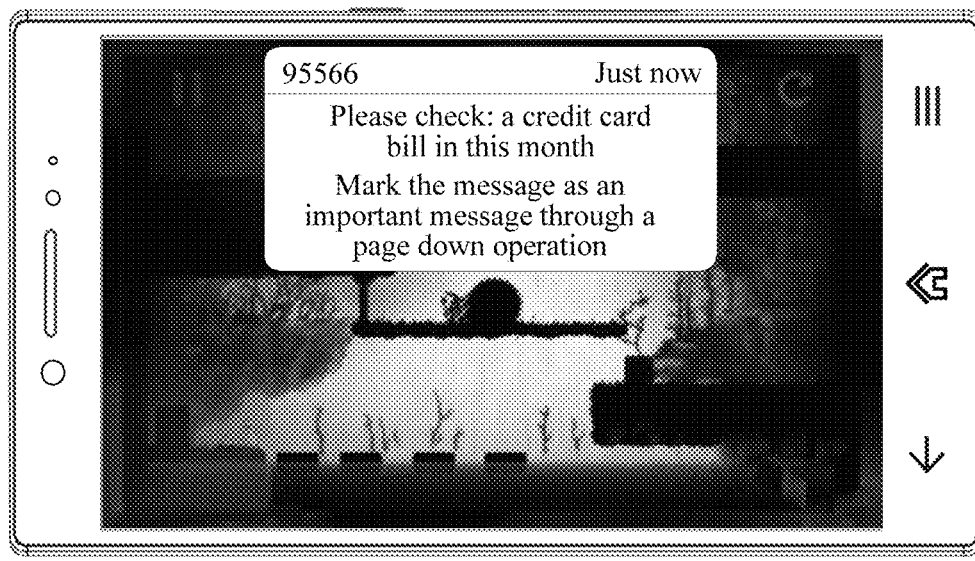
FIG. 26 is a schematic diagram of displaying prompt information according to an embodiment of this application.

For example, referring to FIG. 26, the user may be prompted, in the same message box, that the message may be marked through a page down operation. It should be noted that the function may be enabled or disabled through the user setting, for example, the old user has been accustomed to the manner of performing the input, and the function may be disabled for the old user. A specific prompt manner is not limited in this application. The implementation is convenient for the user to learn of the processing result.

S602: Display a prompt indicating that the processing succeeds.

Figure 27:
FIG. 27 is a schematic diagram of a prompt displaying successful processing according to an embodiment of this application.

For example, referring to FIG. 27, the prompt indicating that the processing succeeds may be displayed when the processing succeeds, and the prompt may automatically disappear after being displayed for a specific time. The implementation is convenient for the user to learn how to process the message through the input.

Figure 28:
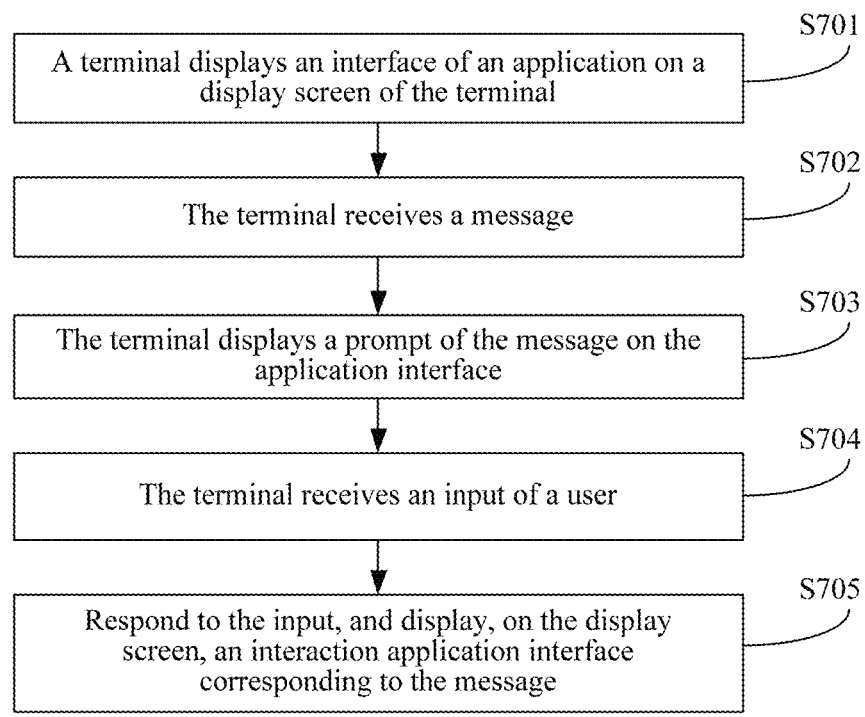
FIG. 28 is a schematic flowchart 1 of a message viewing method according to an embodiment of this application.

This application provides a message viewing method, applied to a terminal having a display screen. When the message is displayed on the display screen, the user may forget the content related to the message. Therefore, the user may open the interaction application interface corresponding to the message through operations such as shaking, rotating the body, and the like. Referring to FIG. 28, the message viewing method includes the following operations.

S701: A terminal displays an application interface on a display screen of the terminal.

The operation is the same as S101. Details are not described again.

S702: The terminal receives a message.

The operation is the same as S102. Details are not described again.

S703: The terminal displays a prompt of the message on the application interface.

The operation is the same as S103. Details are not described again.

S704: The terminal receives an input of a user.

The operation is the same as S104. Details are not described again.

S705: Respond to the input of the user, and display, on the display screen, the interaction application interface corresponding to the message.

For example, the terminal detects that the terminal moves in the first manner, and displays, on the display screen, the interaction application interface corresponding to the message. For the description of the first manner, refer to operation S105. Details are not described again.

In one embodiment, the terminal may further detect, in first preset duration, that the terminal moves in the first manner, and displays, on the display screen, the interaction application interface corresponding to the message. For the description of the first preset duration, refer to operation S104. Details are not described again. The implementation may avoid long-time detection.

Displaying the interaction application interface corresponding to the message means that after the application corresponding to the message is invoked, the interaction interface of the message in the application is entered. For example, the interaction interface may be a dialog interaction interface of the message.

Figure 29A:
FIG. 29A to FIG. 29E are a schematic diagram 1 of viewing a message by shaking a mobile phone according to an embodiment of this application.
Figure 29B:
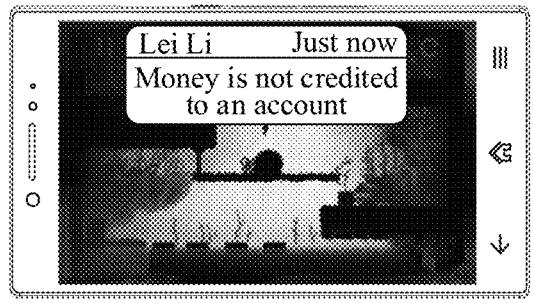
Figure 29C:
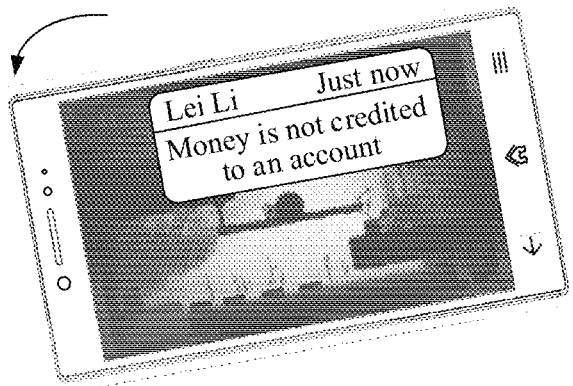
Figure 29D:
Figure 29E:
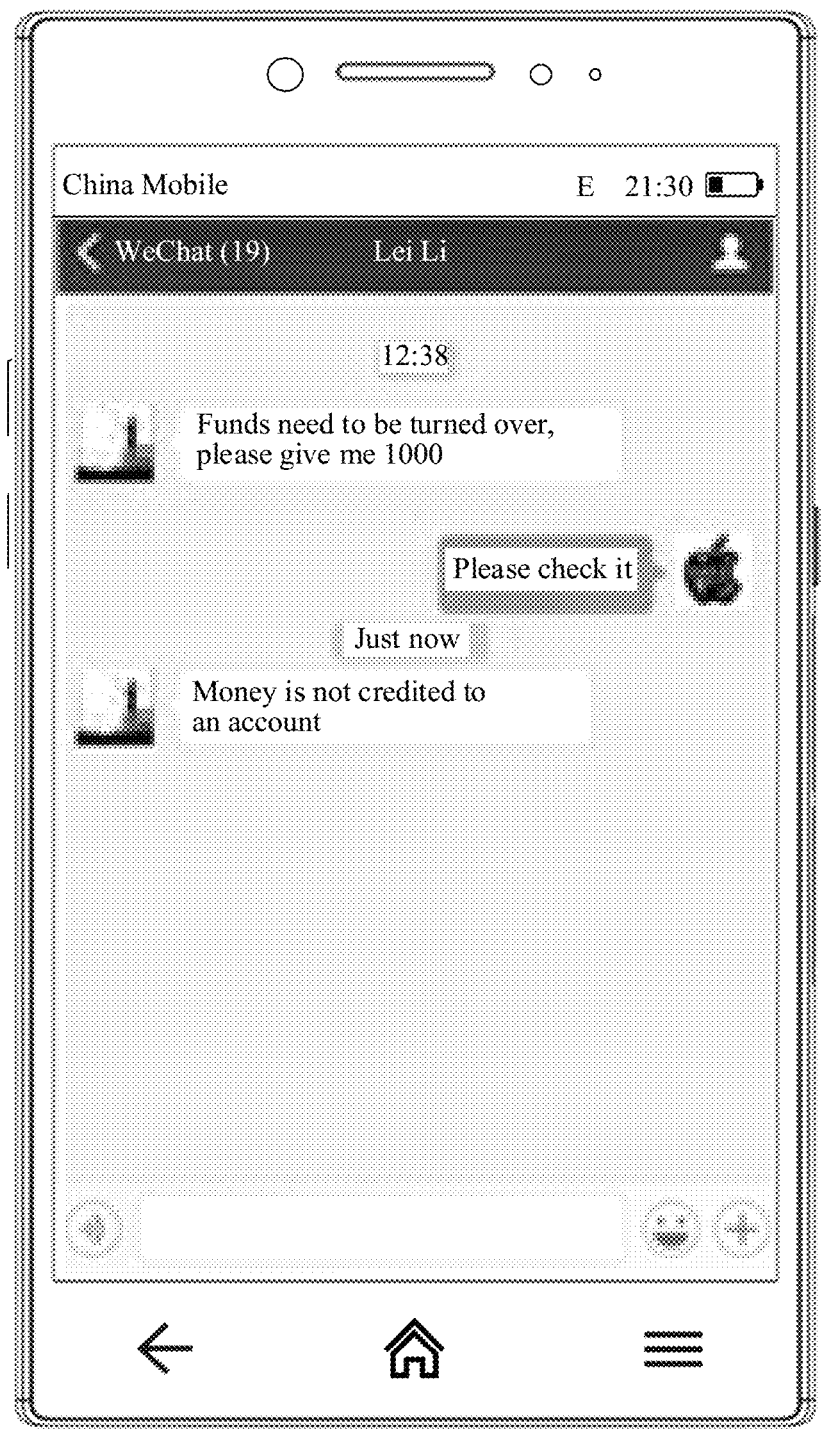

For example, that the application corresponding to the message is WeChat is used as an example, referring to FIG. 29A to FIG. 29E, and compared with FIG. 15A to FIG. 15E, FIG. 29A to FIG. 29D are the same as FIG. 15A to FIG. 15D. Details are not described again. FIG. 29E shows that after moving in the manner shown in FIG. 29C and FIG. 29D, the terminal invokes the dialog interaction interface that is related to the message and that is in WeChat.

By means of the message viewing method provided in this application, when an application interface is displayed, a message comes, and a prompt of the message is displayed on the application interface, an action of viewing the message is performed by receiving the input of the user, and the action of viewing the message does not need to be performed based on detecting a touch or tap performed by the user on the display screen, thereby implementing quick message viewing without affecting the current operation.

Figure 30:
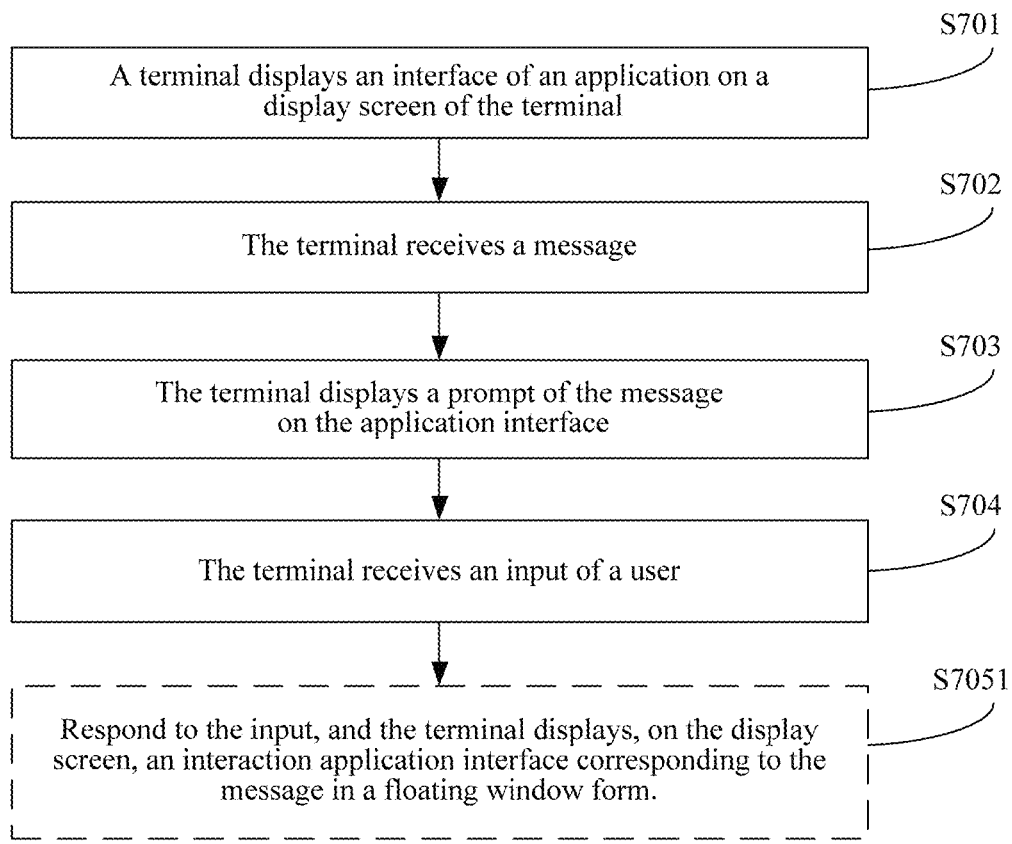
FIG. 30 is a schematic flowchart 2 of a message viewing method according to an embodiment of this application.

It should be noted that FIG. 29A to FIG. 29E show that the terminal displays in full screen, on the display screen, the interaction application interface corresponding to the message, or may display the zoomed-out interaction interface in a screen division or floating window form. In one embodiment, referring to FIG. 30, that display, on the display screen, the interaction application interface corresponding to the message in operation S705 specifically includes operation S7051.

S7051: The terminal displays, on the display screen, the interaction application interface corresponding to the message in a floating window form.

Figure 31E:
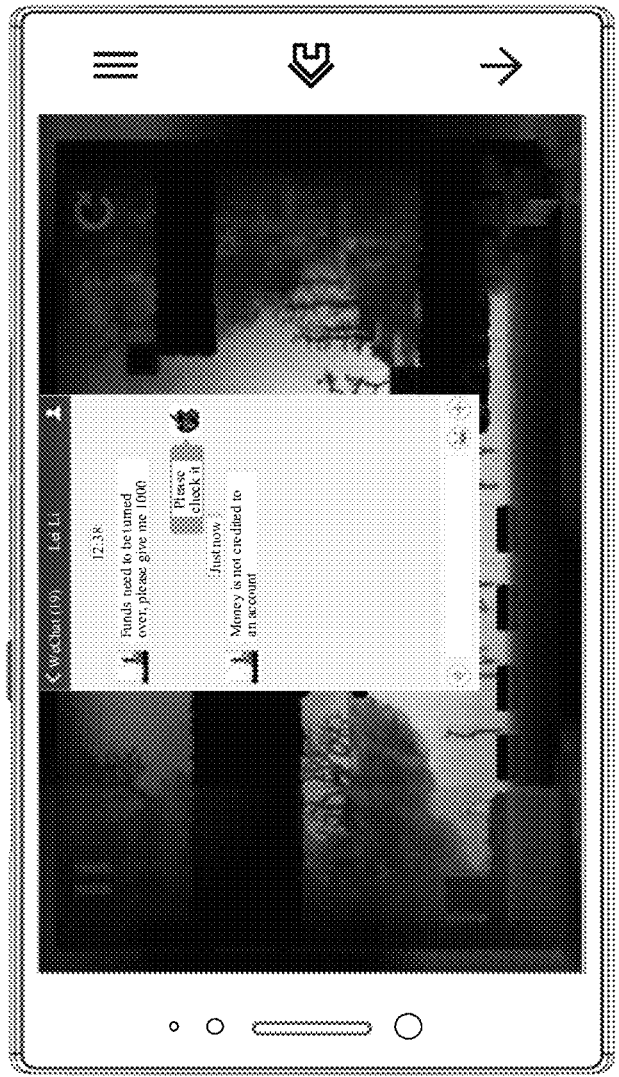

For example, referring to FIG. 31A to FIG. 31E, FIG. 31A to FIG. 31D are the same as FIG. 29A to FIG. 29D. Details are not described again. FIG. 31E shows that the dialog interaction interface of WeChat corresponding to the message is displayed on the top of the current operating application in the floating window form. The implementation provides possible forms for displaying the interaction application interface.

Figure 32:
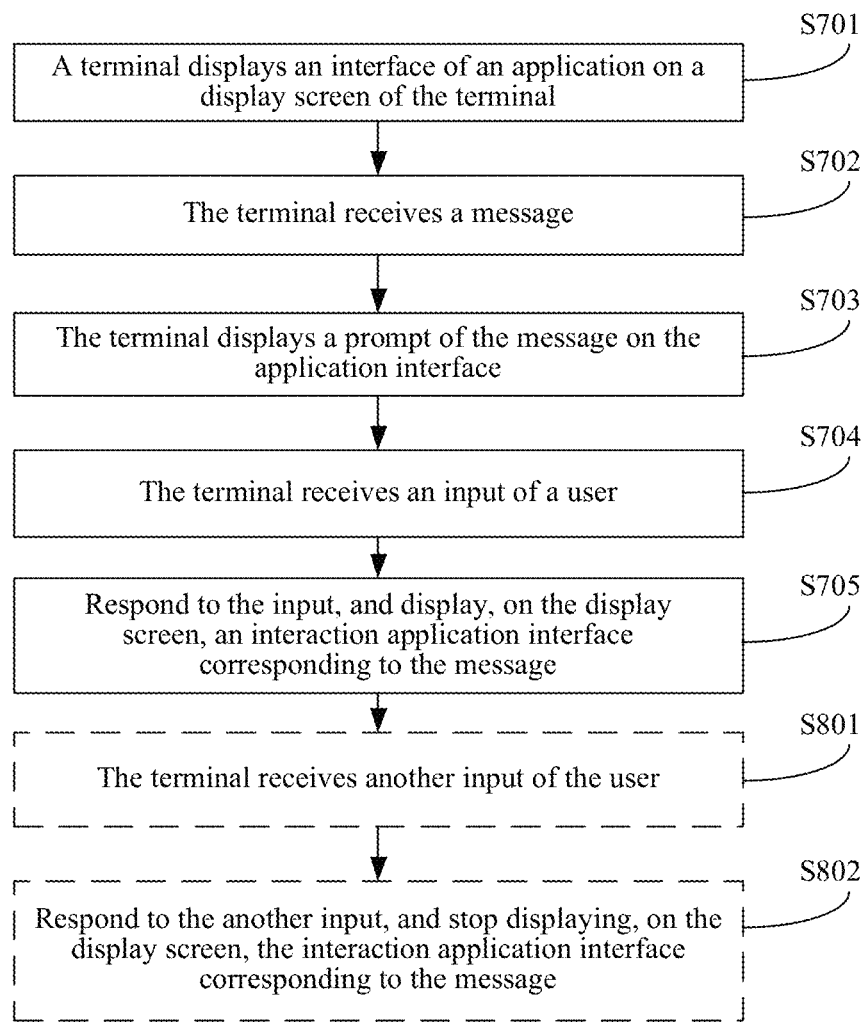
FIG. 32 is a schematic flowchart 3 of a message viewing method according to an embodiment of this application.

After the interaction application interface corresponding to the message is displayed, the user has learned of a dialog scenario of the message, and wants to jump to the original application. It is very inconvenient to switch to the desktop again for searching the original application, in this case, the message may be stopped displaying, and the original application may be jumped to by using other operations such as shaking, rotating the terminal body, and the like. In one embodiment, referring to FIG. 32, the foregoing method may further include operations S801 and S802.

S801: The terminal receives another input of the user.

S802: Respond to the another input, and stop displaying, on the display screen, the interaction application interface corresponding to the message.

For the description of the another input, refer to the description in operation S201. Details are not described again.

In one embodiment, that detect the motion manner of the terminal is used as an example, the terminal may further detect, in second preset duration, that the terminal moves in the second manner, and stops displaying, on the display screen, the interaction application interface corresponding to the message. The implementation may avoid long-time detection.

Figures 33A, 33B:
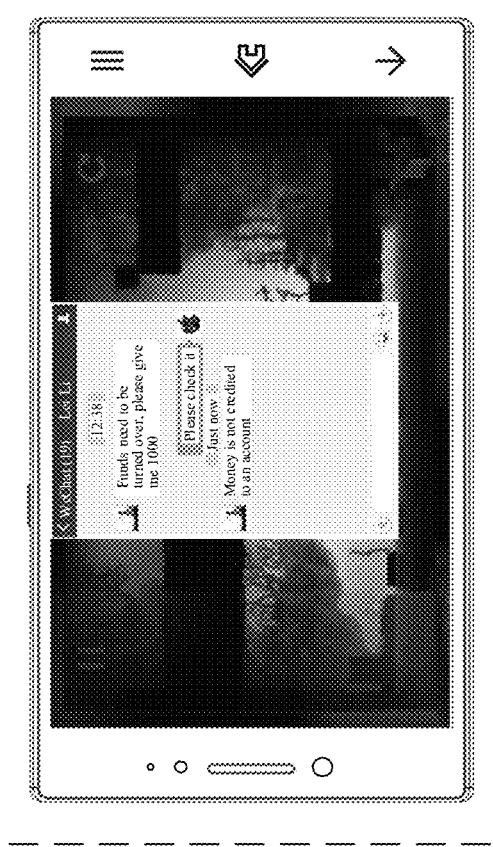
FIG. 33A to FIG. 33D are a schematic diagram of canceling viewing a message by shaking a mobile phone according to an embodiment of this application.
Figure 33C:
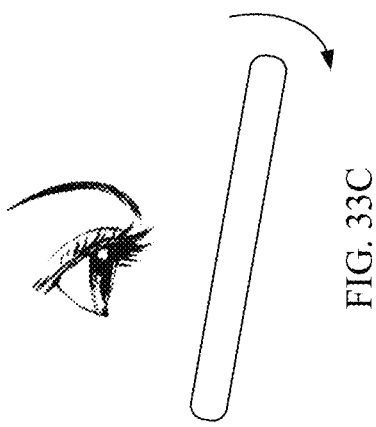
Figure 33D:
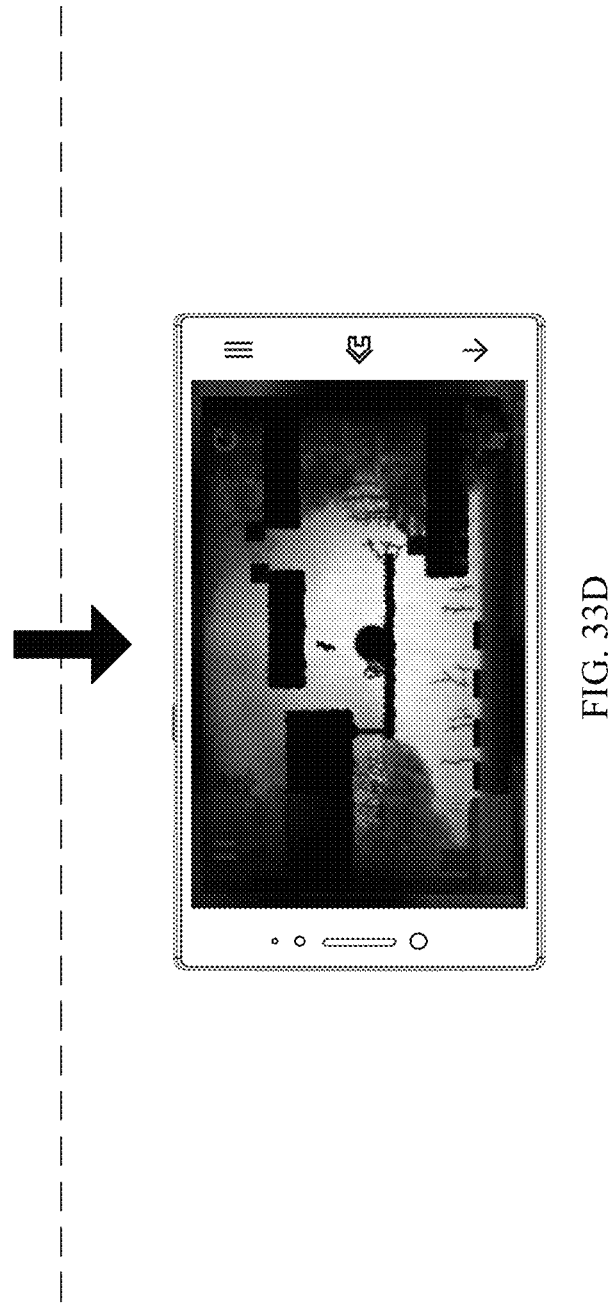

For example, referring to FIG. 33A to FIG. 33D, FIG. 33A is the same as FIG. 15A, FIG. 33B is the same as FIG. 31E, FIG. 33C and FIG. 33D are the same as FIG. 19C and FIG. 19D. Details are not described again.

The implementation implements canceling displaying the interaction application interface corresponding to the message without operating the screen.

This application provides a terminal, configured to perform the foregoing method. In the embodiments of this application, function modules of a terminal device may be divided according to the foregoing method examples. For example, function modules may be obtained corresponding to functions through division, or two or more functions may be integrated into one processing module. The integrated module may be implemented in a form of hardware, or may be implemented in a form of a software functional module. It should be noted that, in this application, module division is exemplary, and is merely a logical function division. In actual implementation, another division manner may be used.

Figure 34:
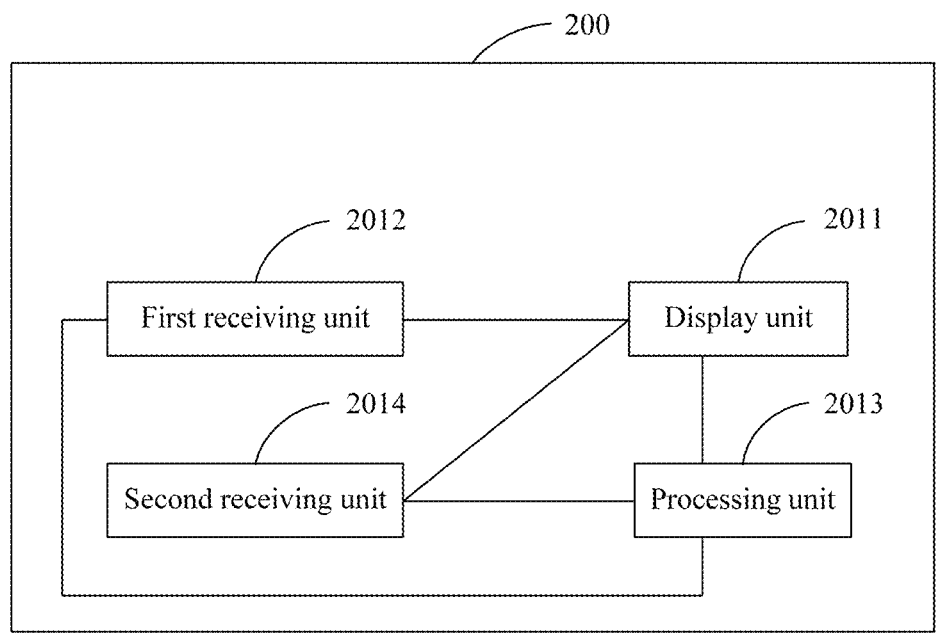
FIG. 34 is a schematic structural diagram 1 of a terminal according to an embodiment of this application.

When the functional modules are divided by using corresponding functions, FIG. 34 is a possible schematic structural diagram of the terminal involved in the foregoing embodiments. A terminal 200 includes: a display unit 2011, a first receiving unit 2012, a processing unit 2013, and a second receiving unit 2014. The display unit 2011 is configured to support the terminal 200 to execute the process S101, S103, and S105 in FIG. 3, the process S101, S103, S105, and S202 in FIG. 18, the process S101, S103, S105, and S301 in FIG. 20, the process S101, S103, and S105 in FIG. 21, the process S101, S103, S105, and S501 in FIG. 23, the process S101, S103, S105, S601, and S602 in FIG. 25, the process S701, S703, and S705 in FIG. 28, the process S701, S703, and S7051 in FIG. 30, and the process S701, S703, S705, and S802 in FIG. 32; the first receiving unit 2011 is configured to support the terminal 200 to execute the process S102 in FIG. 3, the process S102 in FIG. 18, the process S102 in FIG. 20, the process S102 in FIG. 21, the process S102 in FIG. 23, the process S702 in FIG. 28, the process S702 in FIG. 30, and the process S702 in FIG. 32; the processing unit 2013 is configured to support the terminal 200 to execute the process S105 in FIG. 3, the process S105 in FIG. 18, the process S105 in FIG. 20, the process S105 and S401 in FIG. 21, and the process S105, S401, and S502 in FIG. 23; and the second receiving unit 2014 is configured to support the terminal 200 to execute the process S104 in FIG. 3, the process S104 and S201 in FIG. 18, the process S104 in FIG. 20, the process S104 in FIG. 21, the process S104 and S502 in FIG. 23, the process S704 in FIG. 28, the process S704 in FIG. 30, and the process S704 and S801 in FIG. 32. For all related content of the operations involved in the foregoing method embodiments, refer to function descriptions of corresponding functional modules, and details are not described herein again.

Figure 35:
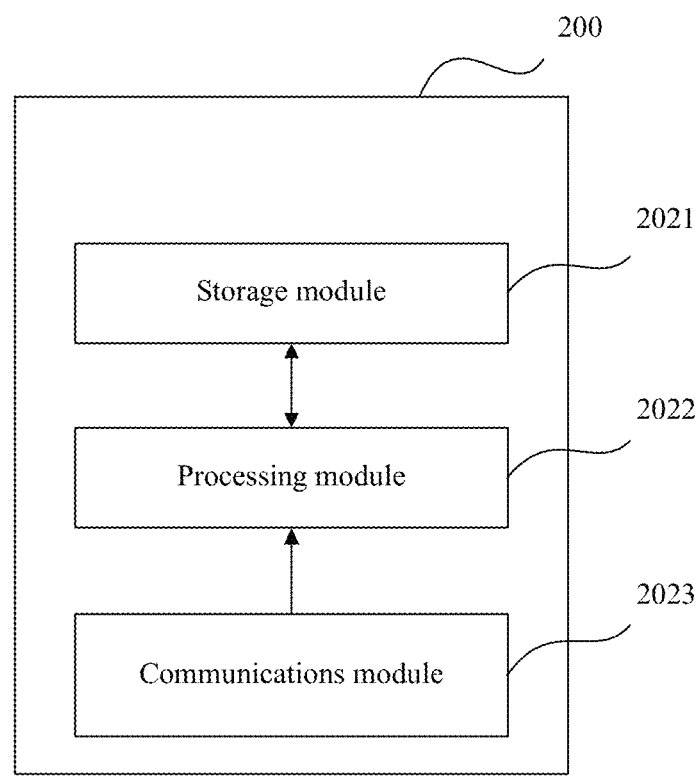
FIG. 35 is a schematic structural diagram 2 of a terminal according to an embodiment of this application.

When an integrated unit is used, FIG. 35 is a schematic diagram of a possible structure of the terminal involved in the foregoing embodiments. The terminal 200 includes a processing module 2022 and a communications module 2023. The processing module 2022 is configured to control and manage actions of the terminal 200, for example, the processing module 2022 is configured to support the terminal 200 to perform functions of the foregoing units. The communications module 2023 is configured to support the terminal to communicate with another entity. The terminal 200 may further include a storage module 2021, configured to store program code and data that are of the terminal.

The processing module 2022 may be a processor or a controller, such as a central processing unit (CPU), a general-purpose processor, a digital signal processor DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 2023 may be a transceiver, transceiver circuit, a network interface, a communications interface, or the like. The storage module 2021 may be a memory.

Specifically, the processing module 2022 may be the processor 280 in FIG. 2, the communications module 2023 may be an RF circuit 210, a Wi-Fi module 270, a Bluetooth module 281 that are in FIG. 2, and the storage module 2021 may be the memory 220 in FIG. 2.

When the processing module 2022 is a processor, the communications module 2023 is an RF circuit. When the storage module 2021 is a memory, the terminal involved in this application may be the terminal 200 shown in FIG. 36.

Figure 36:
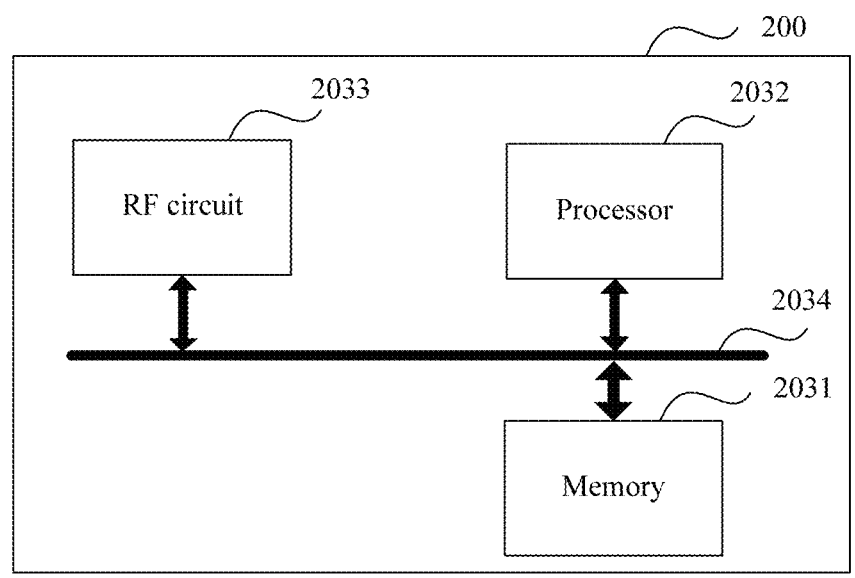
FIG. 36 is a schematic structural diagram 3 of a terminal according to an embodiment of this application.

Referring to FIG. 36, the terminal 200 includes: one or more processors 2032, an RF circuit 2033, a memory 2031, a bus system 2034, and one or more programs. The RF circuit 2033, the processor 2032, and the memory 2031 are connected to each other through the bus system 2034; and the bus system 2034 may be a peripheral component interconnect bus, an extended industry standard architecture bus, or the like. The bus may be classified into an address bus, a data bus, a control bus, and the like. For ease of representation, only one thick line is used to represent the bus in the figure, but this does not mean that there is only one bus or only one type of bus. The one or more programs are stored in the memory 2031, the one or more programs include an instruction, and when the instruction is executed by the terminal, the terminal is enabled to perform the method related in any accompanying drawing in FIG. 3, FIG. 18, FIG. 20, FIG. 21, FIG. 23, FIG. 25, FIG. 28, FIG. 30, and FIG. 32.

This application further provides a computer storage medium storing one or more programs, the one or more programs include an instruction, when the instruction is executed by the terminal, the terminal is enabled to perform the method related in any accompanying drawing in FIG. 3, FIG. 18, FIG. 20, FIG. 21, FIG. 23, FIG. 25, FIG. 28, FIG. 30, and FIG. 32.

This application further provides a graphical user interface on a portable electronic device, the portable electronic device includes a display, a memory, a plurality of application programs, and one or more processors that are configured to execute one or more programs stored in the memory, the graphical user interface includes the user interface displayed by the method related in any accompanying drawing in FIG. 3, FIG. 18, FIG. 20, FIG. 21, FIG. 23, FIG. 25, FIG. 28, FIG. 30, and FIG. 32, and the display includes a touch-sensitive surface and a display screen.

This application further provides a graphical user interface, the graphical user interface is stored in an electronic device, and the electronic device includes a touchscreen, a memory, one or more processors, the foregoing one or more processors are configured to execute one or more computer programs that are stored in the memory. The foregoing graphical user interface includes: a first GUI displayed on the touchscreen, where the first GUI includes an application interface and a prompt of a message; and in response to an input of a user, a second GUI displayed on the touchscreen, where the second GUI includes the application interface.

This application further provides an electronic device, the electronic device includes an apparatus performing the method related in any accompanying drawing in FIG. 3, FIG. 18, FIG. 20, FIG. 21, FIG. 23, FIG. 25, FIG. 28, FIG. 30, and FIG. 32.

This application further provides a computer program product including an instruction, when the computer program product runs on the electronic device, the electronic device is enabled to perform the method related in any accompanying drawing in FIG. 3, FIG. 18, FIG. 20, FIG. 21, FIG. 23, FIG. 25, FIG. 28, FIG. 30, and FIG. 32.

The terminal, the electronic device, the graphical user interface, the computer storage medium, or the computer program product that is provided in this application is configured to perform the corresponding method provided above. Therefore, for beneficial effects that can be achieved by the terminal, the electronic device, the graphical user interface, the computer storage medium, or the computer program product, refer to beneficial effects of the corresponding method provided above, and details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A message processing method, applied to a terminal comprising a display screen, wherein the method comprises:
    displaying, by the terminal, an application interface on the display screen, wherein the application interface is a graphical user interface for operating an application on the terminal;
    subsequent to the displaying of the application interface, receiving, by the terminal, a message;
    displaying, by the terminal, a prompt of the message on the application interface, wherein the prompt of the message indicates that the message has been received;
    receiving, by the terminal, a first input of a user;
    continuing displaying, by the terminal, the application interface, while the terminal responsive to the first input, terminates displaying the prompt of the message, and processes the message; and
    automatically displaying, by the terminal, a processing result of the processing on the display screen after the terminal exits the application interface on the display screen in response to a second input from the user.

2. The method according to claim 1, wherein the processing of the message comprises at least one of the following:
    storing the message in a preset interface;
    marking the message;
    adjusting a location of the message; or
    performing an assortment on the message.

3. The method according to claim 2, wherein the marking of the message comprises:

marking the message when the prompt of the message is displayed, or, marking the message in a lock screen interface or an unlock screen interface; or, marking the message in a notification center interface.

4. The method according to claim 2, wherein the performing of the assortment on the message comprises:

performing the assortment on the message based on characteristic information of the message, wherein the characteristic information is used to identify a common characteristic of a plurality of messages, and the characteristic information comprises at least one of a source, time, a date, a day of a week, a type, a size, duration, or a quantity of characters of the message.

5. The method according to claim 1, wherein when the displaying, by the terminal, of the prompt of the message on the application interface, the method further comprises:

displaying prompt information instructing the user to perform the first input.

6. The method according to claim 1, wherein after the processing of the message succeeds, the method further comprises:

displaying a prompt indicating that the processing succeeds.

7. The method according to claim 1, wherein when the prompt of the message is displayed on the application interface, the method further comprises: displaying, by the terminal, an input box on the application interface; and receiving, by the terminal, a third input of the user in the input box; and the method further comprises: responding to the third input, and storing content of the third input in the message.

8. The method according to claim 2, wherein when the prompt of the message is displayed on the application interface, the method further comprises: displaying, by the terminal, an input box on the application interface; and receiving, by the terminal, a third input of the user in the input box; and the method further comprises: responding to the third input, and storing content of the third input in the message.

9. The method according to claim 1, wherein the application interface comprises: a video play interface, an audio play interface, an instant messaging application interface, a news application interface, a novel reading interface, a shopping interface, a ticketing interface, or a game interface.

10. The method according to claim 2, wherein the application interface comprises: a video play interface, an audio play interface, an instant messaging application interface, a news application interface, a novel reading interface, a shopping interface, a ticketing interface, or a game interface.

11. A device, comprising:

a display screen;

one or more processors;

a memory coupled to the one or more processors and storing program instructions, which, when executed, cause the one or more processors, to perform operations comprising:

displaying an application interface on the display screen, wherein the application interface is a graphical user interface for operating an application on the device;

receiving a message;

displaying a prompt of the message on the application interface, wherein the prompt of the message indicates that the message has been received;

receiving a first input of a user;

continuing displaying the application interface, while the device responsive to the first input, terminates displaying the prompt of the message, and processes the message; and automatically displaying a processing result of the processing on the display screen after the device exits the application interface on the display screen in response to a second input from the user.

12. The device according to claim 11, wherein the processing of the message comprises at least one of the following:

storing the message in a preset interface; or marking the message; or adjusting a location of the message; or performing an assortment on the message.

13. The device according to claim 12, wherein the marking of the message comprises:

marking the message when the prompt of the message is displayed, or, marking the message in a lock screen interface or an unlock screen interface; or, marking the message in a notification center interface.

14. The device according to claim 12, wherein the performing of the assortment on the message comprises:

performing the assortment on the message based on characteristic information of the message, wherein the characteristic information is used to identify a common characteristic of a plurality of messages, and the characteristic information comprises at least one of a source, time, a date, a day of a week, a type, a size, duration, or a quantity of characters of the message.

15. The device according to claim 11, the operations further comprise:

when the displaying a prompt of the message on the application interface, displaying prompt information for instructing the user to perform the first input.

16. The device according to claim 11, the operations further comprise:

after the processing the message succeeds, displaying a prompt indicating that the processing succeeds.

17. The device according to claim 11, the operations further comprise:

when the prompt of the message is displayed on the application interface, displaying an input box on the application interface;

receiving a third input of the user in the input box; and responding to the third input, and storing content of the third input in the message.

18. The device according to claim 12, the operations further comprise:

when the prompt of the message is displayed on the application interface, displaying an input box on the application interface; and receiving a third input of the user in the input box; and responding to the third input, and storing content of the third input in the message.

19. The device according to claim 11, wherein the application interface comprises: a video play interface, an audio play interface, an instant messaging application interface, a news application interface, a novel reading interface, a shopping interface, a ticketing interface, or a game interface.

20. The device according to claim 12, wherein the application interface comprises: a video play interface, an audio play interface, an instant messaging application interface, a news application interface, a novel reading interface, a shopping interface, a ticketing interface, or a game interface.

\* \* \* \* \*